(12) United States Patent
Smith et al.

(10) Patent No.: US 7,881,913 B2
(45) Date of Patent: Feb. 1, 2011

(54) EXEMPLAR/PDE-BASED TECHNIQUE TO FILL NULL REGIONS AND CORRESPONDING ACCURACY ASSESSMENT

(75) Inventors: Anthony O'Neil Smith, Melbourne, FL (US); Patrick Kelley, Palm Bay, FL (US); Harlan Yates, Melbourne, FL (US); Mark Rahmes, Melbourne, FL (US); Josef Allen, Melbourne, FL (US); Kathleen Berisford, Malabar, FL (US)

(73) Assignee: Harris Corporation, Melbourne, FL (US)

( * ) Notice: Subject to any disclaimer, the term of this patent is extended or adjusted under 35 U.S.C. 154(b) by 573 days.

(21) Appl. No.: 12/022,283

(22) Filed: Jan. 30, 2008

(65) Prior Publication Data
US 2008/0319723 A1 Dec. 25, 2008

Related U.S. Application Data

(60) Provisional application No. 60/889,430, filed on Feb. 12, 2007.

(51) Int. Cl.
*G06F 17/50* (2006.01)
*G06F 17/00* (2006.01)
*G06G 7/48* (2006.01)
*G06G 5/00* (2006.01)
*G01V 3/38* (2006.01)
*G01V 1/40* (2006.01)
*G01C 9/00* (2006.01)
*H03F 1/26* (2006.01)
*G06T 15/10* (2006.01)
*G09G 5/00* (2006.01)
*G06K 9/00* (2006.01)
*G06K 9/40* (2006.01)

(52) U.S. Cl. ........... 703/2; 703/1; 703/6; 702/5; 702/6; 702/152; 702/189; 702/190; 345/427; 345/582; 345/619; 345/629; 345/634; 382/109; 382/254; 382/294; 382/582; 706/45

(58) Field of Classification Search ............ 703/1, 703/2, 6; 702/5, 6, 152, 189, 190; 706/45; 707/100; 345/427, 582, 619, 629, 634; 382/109, 382/254, 294, 582
See application file for complete search history.

(56) References Cited

U.S. PATENT DOCUMENTS

| | | | | |
|---|---|---|---|---|
| 6,654,690 | B2 * | 11/2003 | Rahmes et al. | 702/5 |
| 6,987,520 | B2 * | 1/2006 | Criminisi et al. | 345/629 |
| 7,142,984 | B2 * | 11/2006 | Rahmes et al. | 702/5 |

(Continued)

OTHER PUBLICATIONS

Allen et al. "Topography-Preserving, Non-Linear Inpainting for Autonomous Bare Earth Digital Elevation Model (DEM)", Nov. 6-10, 2006.*

(Continued)

*Primary Examiner*—Kamini S Shah
*Assistant Examiner*—Shambhavi Patel
(74) *Attorney, Agent, or Firm*—Allen, Dyer, Doppelt, Milbrath & Gilchrist, P.A.

(57) ABSTRACT

A geospatial modeling system may include a geospatial data storage device, and a processor cooperating with the geospatial data storage device for selectively inpainting data into at least one void in geospatial model data using a partial differential equation (PDE) algorithm and an exemplar algorithm.

29 Claims, 26 Drawing Sheets

U.S. PATENT DOCUMENTS

| | | | |
|---|---|---|---|
| 7,191,066 B1* | 3/2007 | Rahmes et al. | 702/5 |
| 7,292,941 B1* | 11/2007 | Rahmes et al. | 702/5 |
| 7,298,891 B2* | 11/2007 | McDowall et al. | 382/154 |
| 7,304,645 B2* | 12/2007 | Blask et al. | 345/424 |
| 7,376,513 B2* | 5/2008 | Rahmes et al. | 702/5 |
| 7,391,899 B2* | 6/2008 | Rahmes et al. | 382/154 |
| 7,487,046 B2* | 2/2009 | Rahmes et al. | 702/5 |
| 7,528,938 B2* | 5/2009 | Garceau et al. | 356/4.01 |
| 7,539,605 B2* | 5/2009 | Rahmes et al. | 703/6 |
| 7,567,731 B2* | 7/2009 | McDowall et al. | 382/294 |
| 7,603,208 B2* | 10/2009 | Garceau et al. | 701/3 |
| 7,616,828 B2* | 11/2009 | Rahmes et al. | 382/260 |
| 7,630,797 B2* | 12/2009 | Garceau et al. | 701/3 |
| 7,750,902 B2* | 7/2010 | Rahmes et al. | 345/420 |
| 7,752,018 B2* | 7/2010 | Rahmes et al. | 703/2 |
| 7,760,913 B2* | 7/2010 | Rahmes et al. | 382/109 |
| 7,764,810 B2* | 7/2010 | Rahmes et al. | 382/109 |
| 7,778,808 B2* | 8/2010 | Miller et al. | 703/2 |
| 2003/0225513 A1* | 12/2003 | Gagvani et al. | 701/211 |
| 2006/0176213 A1 | 8/2006 | Rahmes et al. | 342/140 |
| 2007/0198586 A1* | 8/2007 | Hardy et al. | 707/104.1 |
| 2008/0273759 A1* | 11/2008 | Rahmes et al. | 382/109 |
| 2008/0319723 A1* | 12/2008 | Smith et al. | 703/2 |
| 2009/0083005 A1* | 3/2009 | Allen et al. | 703/1 |
| 2009/0083008 A1* | 3/2009 | Allen et al. | 703/2 |
| 2009/0083012 A1* | 3/2009 | Allen et al. | 703/6 |
| 2009/0083291 A1* | 3/2009 | Allen et al. | 707/100 |
| 2009/0085915 A1* | 4/2009 | Kelley et al. | 345/427 |
| 2009/0089017 A1* | 4/2009 | Kelley et al. | 703/1 |
| 2009/0089018 A1* | 4/2009 | Kelley et al. | 703/1 |

OTHER PUBLICATIONS

Bertalmio, et al. "Navier-Stokes, Fluid Dynamics, and Image and Video Inpainting", 2001.*

Criminisi et al. "Region Filling and Object Removal by Exemplar-Based Image Inpainting", IEEE Transactions on Image Processing, vol. 13, No. 9, Sep. 2004.*

Dowding et al. "Void Fill of SRTM Elevation Data—Principles, Processes and Performance", Sep. 2004.*

Gooch et al. "Failure Prediction in Automatically Generated Digital Elevation Models", Computers and Geosciences 27 (2001), 913-920.*

Grohman et al. "Filling SRTM Voids: The Delta Surface Fill Method", Photogrammetric Engineering and Remote Sensing, Mar. 2006.*

Hirani, et al. "Combining Frequency and Spatial Domain Information for Fast Interactive Image Noise Removal", ACM 1996.*

Jaynes et al. "Recognition and reconstruction of buildings from multiple aerial images", Computer Vision and Image Understanding 90 (2003) 68-98.*

Mason, Scott. "3D Building Reconstruction Using Composites of Surface Primitives: Concepts", International Archives of Photogrammetry and Remote Sensing, vol. XXXI, Part B3, 1996.*

Patwardhan, Kedar. "Techniques for Automatic Image Inpainting", Apr. 2004.*

Suveg et al. "Automatic 3D Building Reconstruction", Proceedings of SPIE vol. 4661 (2002).*

Wecker at al. "Contextual Void Patching for Digital Elevation Models", Visual Comput (2007) 23: 881-890.*

Criminisi et al., Object Removal by Exemplar-Based Inpainting, in Conf. Computer Vision and Pattern Recog, CVPR'03, vol. 2, pp. 721-728, Madison, WI, Jun. 2003.

"Structure and Texture Filling-In of Missing Image Blocks in Wireless Transmission and Compression", Rane et al., Proceedings 2002 International Conference on Image Processing. ICIP 2002. Rochester, NY, Sep. 22-25, 2002, IEEE, US, vol. 1, Sep. 22, 2002, pp. 317-320, XP010607324, ISBN: 978-07803-7622-9.

"A Combined PDE and Texture Synthesis Approach to Inpainting", Harald Grossauer, Computer Vision—ECCV 2004 Lecture Notes in Computer Science; LNCS, Springer-Verlag, BE. vol. 3022, Jan. 1, 2004, pp. 214-224, XP019005823, ISBN:978-3-540-21983-5.

"Autonomous Selection of PDE Inpainting Techniques vs. Exemplar Inpainting Techniques for Void Fill of High Resolution Digital Surface Models", Rahmes et al., Proceedings of the SPIE, Modeling and Simulation for Military Operations II, vol. 6564, No. 1, Apr. 30, 2007, pp. 656405-1-656405-9, XP002480892.

"An Adaptive Algorithm for Electronic Imaging", Ciric et al., IEEE Transactions on Magnetics, IEEE Service Center, New York, US, vol. 32, No. 3, May 1, 1996, pp. 1302-1305, XP011085550, ISSN: 0018-9464.

* cited by examiner

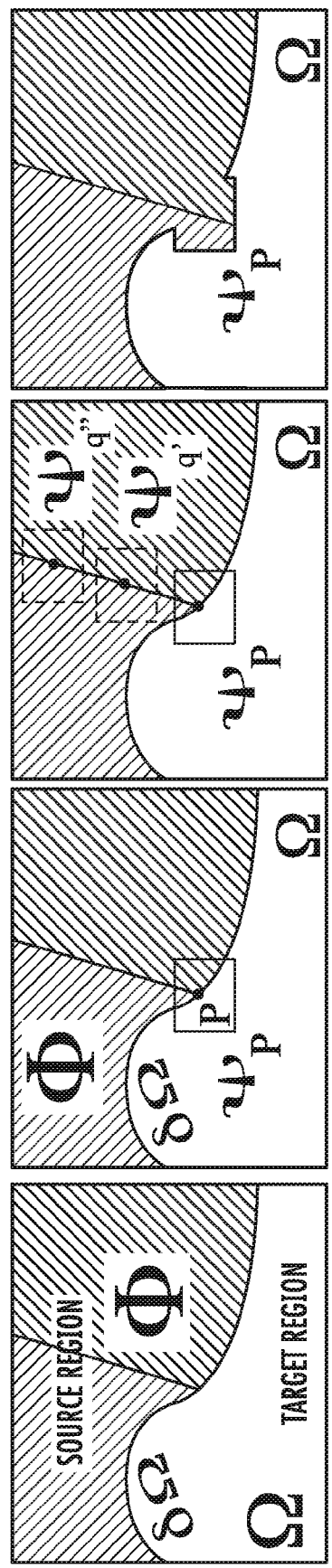

EXEMPLAR/PDE-BASED TECHNIQUE TO FILL NULL REGIONS AND CORRESPONDING ACCURACY ASSESSMENT

RELATED APPLICATION

This application is based upon prior filed co-pending provisional application Ser. No. 60/889,430 filed Feb. 12, 2007, the entire subject matter of which is incorporated herein by reference in its entirety.

FIELD OF THE INVENTION

The present invention relates to the field of topography, and, more particularly, to a system and related methods for generating topographical models.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR).

Another similar system from Harris Corp. is LiteSite®. LiteSite® models provide automatic extraction of ground, foliage, and urban digital elevation models (DEMs) from LIDAR and IFSAR imagery. LiteSite™ can be used to produce affordable, geospatially accurate, high-resolution 3-D models of buildings and terrain.

U.S. Pat. No. 6,654,690 to Rahmes et al., which is also assigned to the present Assignee and is hereby incorporated herein in its entirety by reference, discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

While the above-noted approaches provide exceptional 3D models of urban areas with accurate and realistic cultural (e.g., building) feature detail, in some applications it may be desirable to produce a topographical model of a geographical area of interest without the cultural features otherwise present in the area of interest. Yet, once the cultural features are identified and extracted from the terrain data, there may be voids left in the resulting DEM. Moreover, in some situations it may be desirable to focus on cultural features from an area of interest, but foliage, etc., may obscure portions of one or more cultural features that will similarly result in voids in the cultural feature when the foliage is extracted.

Various interpolation techniques are generally used for filling in missing data in a data field. One such technique is sinc interpolation, which assumes that a signal is band-limited. While this approach is well suited for communication and audio signals, it may not be well suited for 3D data models. Another approach is polynomial interpolation. This approach is sometimes difficult to implement because the computational overhead may become overly burdensome for higher order polynomials, which may be necessary to provide desired accuracy.

One additional interpolation approach is spline interpolation. While this approach may provide a relatively high reconstruction accuracy, this approach may be problematic to implement in a 3D data model because of the difficulty in solving a global spline over the entire model, and because the required matrices may be ill-conditioned. One further drawback of such conventional techniques is that they tend to blur edge content, which may be a significant problem in a 3D topographical model.

Another approach for filling in regions within an image is set forth in U.S. Pat. No. 6,987,520 to Criminisi et al. This patent discloses an exemplar-based filling system which identifies appropriate filling material to replace a destination region in an image and fills the destination region using this material. This is done to alleviate or minimize the amount of manual editing required to fill a destination region in an image. Tiles of image data are "borrowed" from the proximity of the destination region or some other source to generate new image data to fill in the region. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

Despite the advantages such prior art approaches may provide in certain applications, further advancements may be desirable for filling voids in geospatial model data.

SUMMARY OF THE INVENTION

In view of the foregoing background, it is an object of the present invention to provide a geospatial modeling system and related methods which may advantageously fill voids within geospatial models and related methods.

This and other objects, features, and advantages are provided by a geospatial modeling system which may include a geospatial data storage device, and a processor cooperating with the geospatial data storage device for selectively inpainting data into at least one void in geospatial model data using a partial differential equation (PDE) algorithm and an exemplar algorithm. More particularly, the processor may further determine a void complexity predictor metric for the at least one void based upon a perimeter of the at least one void, and select between the PDE algorithm and the exemplar algorithm based upon the void complexity predictor metric.

By way of example, the processor may select between the PDE algorithm and the exemplar algorithm based upon whether the void complexity predictor metric is greater than a data frequency threshold. More specifically, the processor may select the exemplar algorithm if the void complexity predictor is greater than the data frequency threshold, and otherwise selects the PDE algorithm. Furthermore, the processor may initially select and iteratively use the exemplar algorithm until the void complexity predictor is less than the data frequency threshold, and then select and iteratively use the PDE algorithm. The processor may also select between the PDE algorithm and the exemplar algorithm based upon a size of the geospatial model data, for example.

The geospatial model data may comprise elevation data, for example. Moreover, the processor may use the PDE algorithm to inpaint by propagating elevation contour data from outside the at least one void along a direction of lines of constant elevation contour from outside the at least one void into the at least one void. More specifically, the processor may iteratively propagate the elevation contour data from outside the at least one void into the at least one void.

Selectively inpainting may comprise iteratively inpainting data into the at least one void until stopping value associated with the at least one void is below an error threshold. The processor may receive as an input geospatial model data containing both geospatial model terrain data and geospatial model cultural feature data, and extract and processes the geospatial model cultural feature data. By way of example, the PDE algorithm may comprise at least one turbulent fluid flow modeling algorithm. Also, the geospatial model data may comprise digital elevation model (DEM) data.

A geospatial modeling method aspect may include providing geospatial model frequency domain data, and selectively inpainting data into at least one void in the geospatial model data using a PDE algorithm and an exemplar algorithm. A computer-readable medium is also provided, which may have computer-executable instructions for causing a computer to perform at least one step comprising selectively inpainting data into at least one void in geospatial model data using a PDE algorithm and an exemplar algorithm.

BRIEF DESCRIPTION OF THE DRAWINGS

FIGS. 15A-15D are a series of close-up views of a void in geospatial model data illustrating an exemplar inpainting technique used by the system of FIG. 14.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
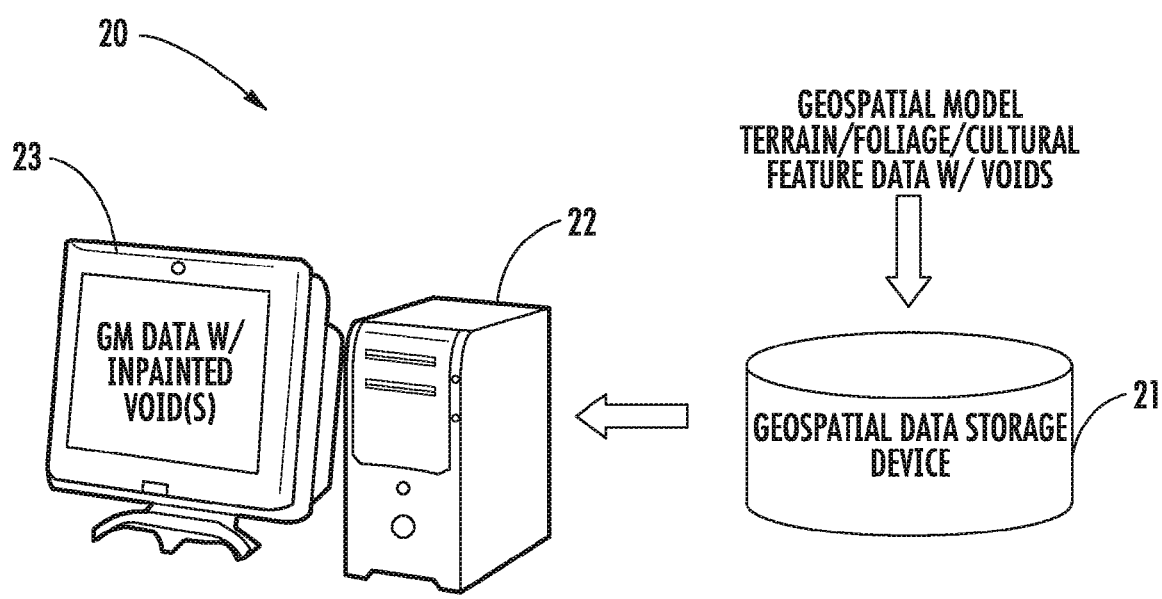
FIG. 1 is a schematic block diagram of a geospatial modeling system in accordance with the invention.

Referring initially to FIG. 1, a geospatial modeling system 20 illustratively includes a geospatial data storage device 21 and a processor 22, such as a central processing unit (CPU) of a PC, Mac, or other computing workstation, for example. A display 23 may be coupled to the processor 22 for displaying geospatial modeling data, as will be discussed further below.

Figure 2:
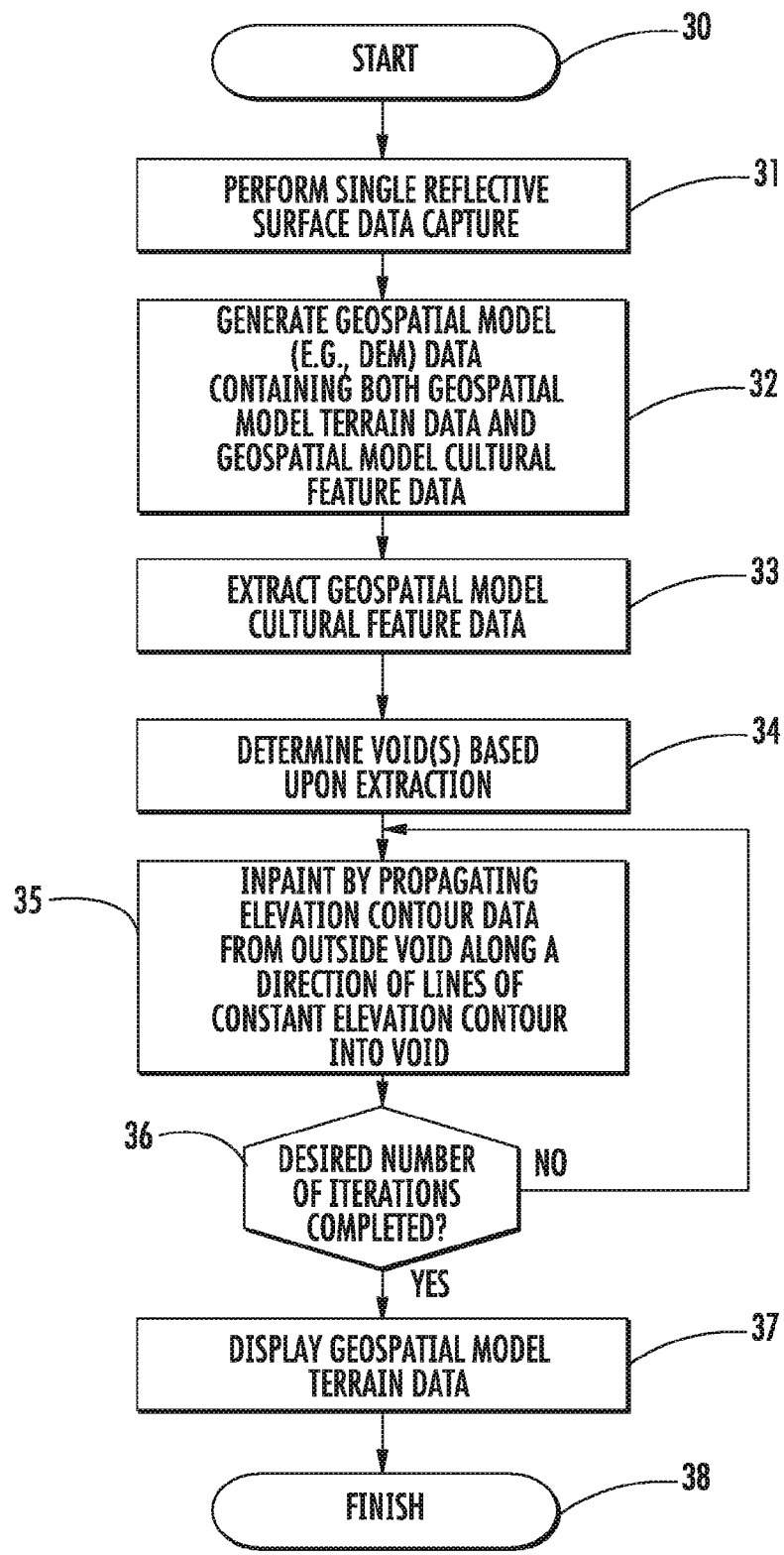
FIG. 2 is a flow diagram illustrating a geospatial modeling method aspect for void inpainting within geospatial model terrain data in accordance with the invention.

Turning additionally to FIGS. 2-4, an approach for inpainting data into one or more voids in geospatial model terrain data is now described. It should be noted that in some embodiments the techniques discussed herein may be used for inpainting other types of data, such as fingerprint data, image data, etc., for example. Beginning at Block 30, one or more data captures are performed for the geographical area of interest to obtain 3D elevation versus position data. The data capture may be performed using various techniques, such as stereo optical imagery, Light Detecting And Ranging (LI-DAR), Interferometric Synthetic Aperture Radar (IFSAR), etc. Generally speaking, the data will be captured from nadir views of the geographical area of interest by airplanes, satellites, etc., as will be appreciated by those skilled in the art. However, oblique images of a geographical area of interest may also be used in addition to or instead of the images to add additional 3D detail to a geospatial model.

In the illustrated example, a single reflective surface data capture is performed to provide the 3D data of the geographical area of interest, at Block 31. The "raw" data provided from the collection will typically include terrain, foliage, and/or cultural features (e.g., buildings). The processor 22 uses this raw data to generate a geospatial model (i.e., DEM) of the elevation verses position data based upon the known position of the collectors, etc., at Block 32, using various approaches which are known to those skilled in the art. Of course, in other embodiments the DEM may be generated by another computer and stored in the geospatial data storage device 21 for processing by the processor 22. The DEM data may have a relatively high resolution, for example, of greater than about thirty meters to provide highly accurate image detail, although lower resolutions may be used for some embodiments, if desired. In some embodiments, resolutions of one meter or better may be achieved.

Figure 3A:
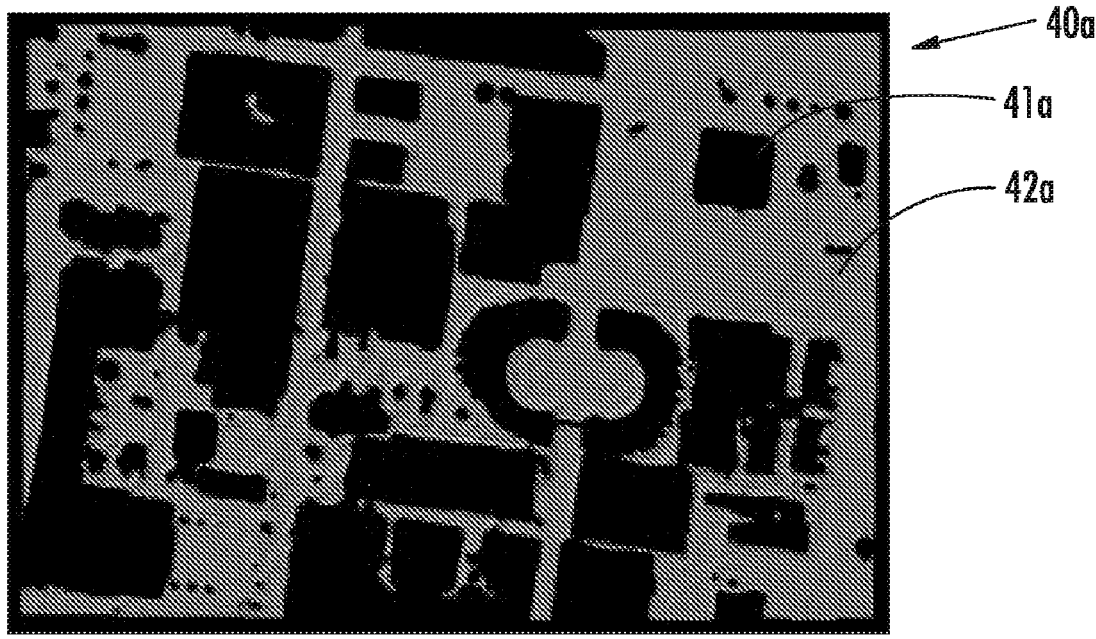
FIGS. 3A-3B are nadir views of geospatial model terrain data in a DEN before and after void inpainting in accordance with the invention.
Figure 3B:
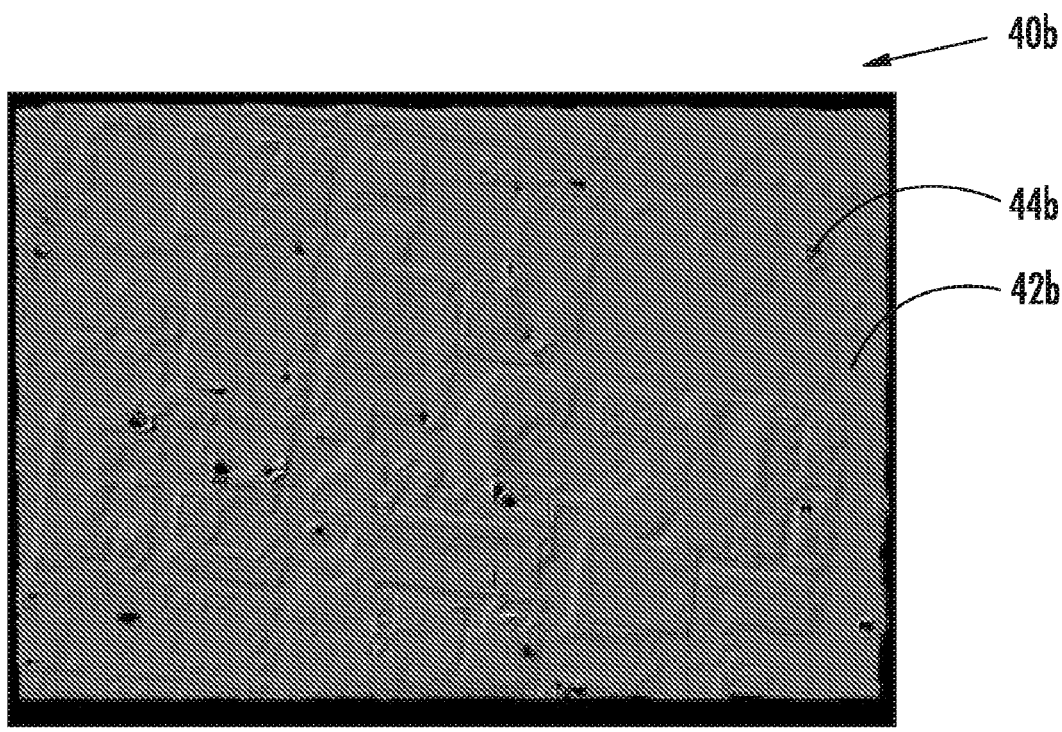

In many instances it is desirable to separate or extract one of the above-noted types of data from a geospatial model. For example, in some cases it may be desirable to remove the cultural features from a DEM so that only the terrain and/or foliage remains, at Block 33. In particular, the extraction process may include a series of DEN re-sampling, null filling, DEN subtraction, and null expanding steps, as will be appreciated by those skilled in the art. Yet, extracting the cultural features would ordinarily leave holes or voids within the DEM. A DEM 40a is shown in FIGS. 3A and 3B in which voids 41a appear in terrain 42a where buildings have been extracted.

When features have been extracted from the geospatial model, this makes determination of voids to be filled (Block 34) relatively straightforward, as these voids will occur where the cultural feature or other data has been extracted. However, in some embodiments the voids may result from causes other than data extraction, such as a blind spot of a collector, clouds over a geographical area or interest, etc. The approach described herein may also be used to correct such voids as well.

Figure 4A:
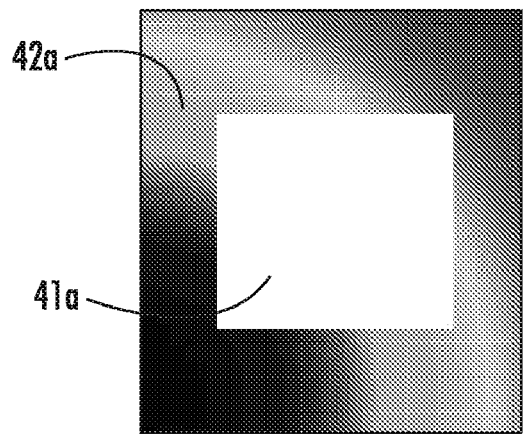
FIGS. 4A-4D are a series of close-up views of a void in geospatial model terrain data illustrating the inpainting technique used in FIGS. 3A and 3B in greater detail.
Figure 4B:
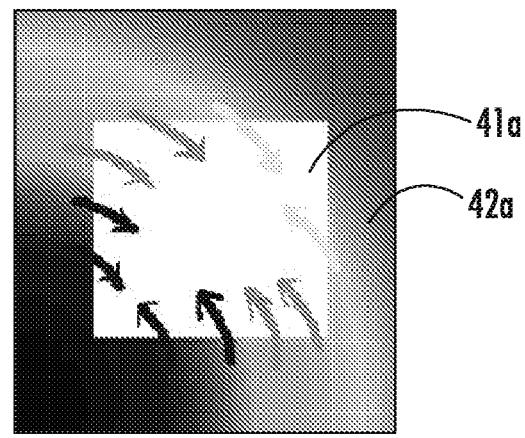
Figure 4C:
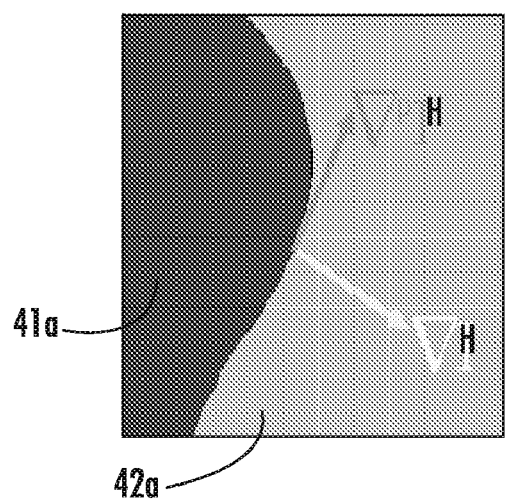

Generally speaking, the voids 41a are inpainted by propagating contour data from outside a given void into the given void, at Block 35. More particularly, the processor 22 inpaints by propagating elevation contour data from outside the given void along a direction of lines of constant elevation contour from outside the given void into the void, as seen in FIGS. 4A-4D. More particularly, the lines of constant elevation contour may be based upon isophote ($\nabla^P H$) and gradient ($\nabla H$) directions at given points along the void boundary, as shown in FIG. 4C. As will be appreciated by those skilled in the art, inpainting is a non-linear interpolation technique which in the present example is used to propagate the data from the area around a void created by an extracted building to "fill" the void.

More particularly, the processor 22 propagates elevation information from outside the void along a direction of iso-contour, as represented by the following equation:

$$\frac{\partial I}{\partial t} = \nabla L \cdot N, \quad (1)$$

where $\nabla L$ is a discrete Laplacian transform. An iso-contour direction N is obtained by taking a 90 degree rotation of the DEM gradient, as will be appreciated by those skilled in the art. An inpainting equation for performing the above-noted propagation is as follows:

$$H^{n+1}(i,j) = H^n(i,j) + \Delta t H_t^n(i,j), \forall (i,j) \in \Omega. \quad (2)$$

Figure 4D:
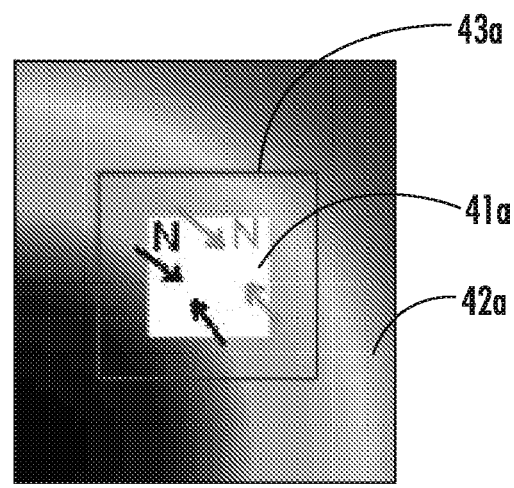

The above-noted propagation is performed a certain number of iterations to "shrink" the void to a desired size as seen in FIG. 4D. The starting boundary 43a of the void is shown in FIG. 4D so that the amount of propagation from one iteration may be seen. After the desired number of iterations are performed, at Block 36, then the final geospatial model terrain data 40b may be displayed on the display 23, at Block 37, thus concluding the illustrated method (Block 38). In the present example, 4000 iterations of propagation were used for inpainting the voids 41a in the geospatial model terrain data, but more or less numbers of iterations may be used in different embodiments depending upon the required accuracy and the computational overhead associated therewith.

Generally speaking, the above-described approach essentially treats a DEM as an incompressible fluid, which allows fluid mechanics techniques to be used for filling in the voids. That is, the partial differential equations outlined above are used to estimate how the boundaries directly adjacent a void in the 3D model would naturally flow into and fill the void if the DEM were considered to be an incompressible fluid, as will be appreciated by those skilled in the art.

This approach advantageously allows for autonomous reconstruction of bare earth in places where buildings or other cultural features have been removed, yet while still retaining continuous elevation contours. Moreover, the non-linear interpolation technique of inpainting allows for accurate propagation of data from the area surrounding a void boundary. Further, the DEM may advantageously be iteratively evolved until a steady state is achieved, and the speed of propagation may be controlled to provide a desired tradeoff between accuracy of the resulting geospatial data and the speed so that the processing overhead burden does not become undesirably large, as will be appreciated by those skilled in the art.

Figure 5:
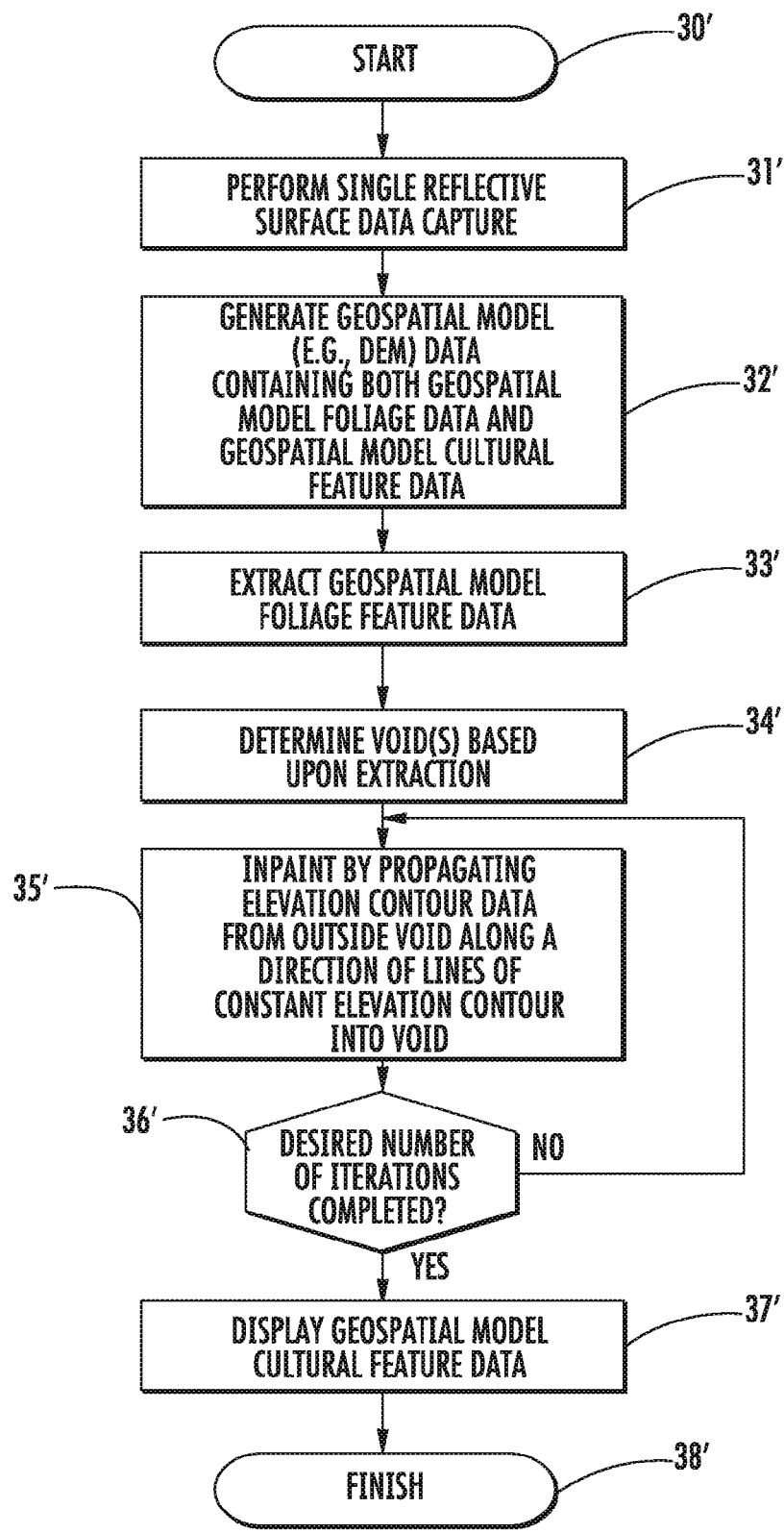
FIG. 5 is a flow diagram illustrating an alternative geospatial modeling method aspect for void inpainting within geospatial model cultural feature data in accordance with the invention.
Figure 6:
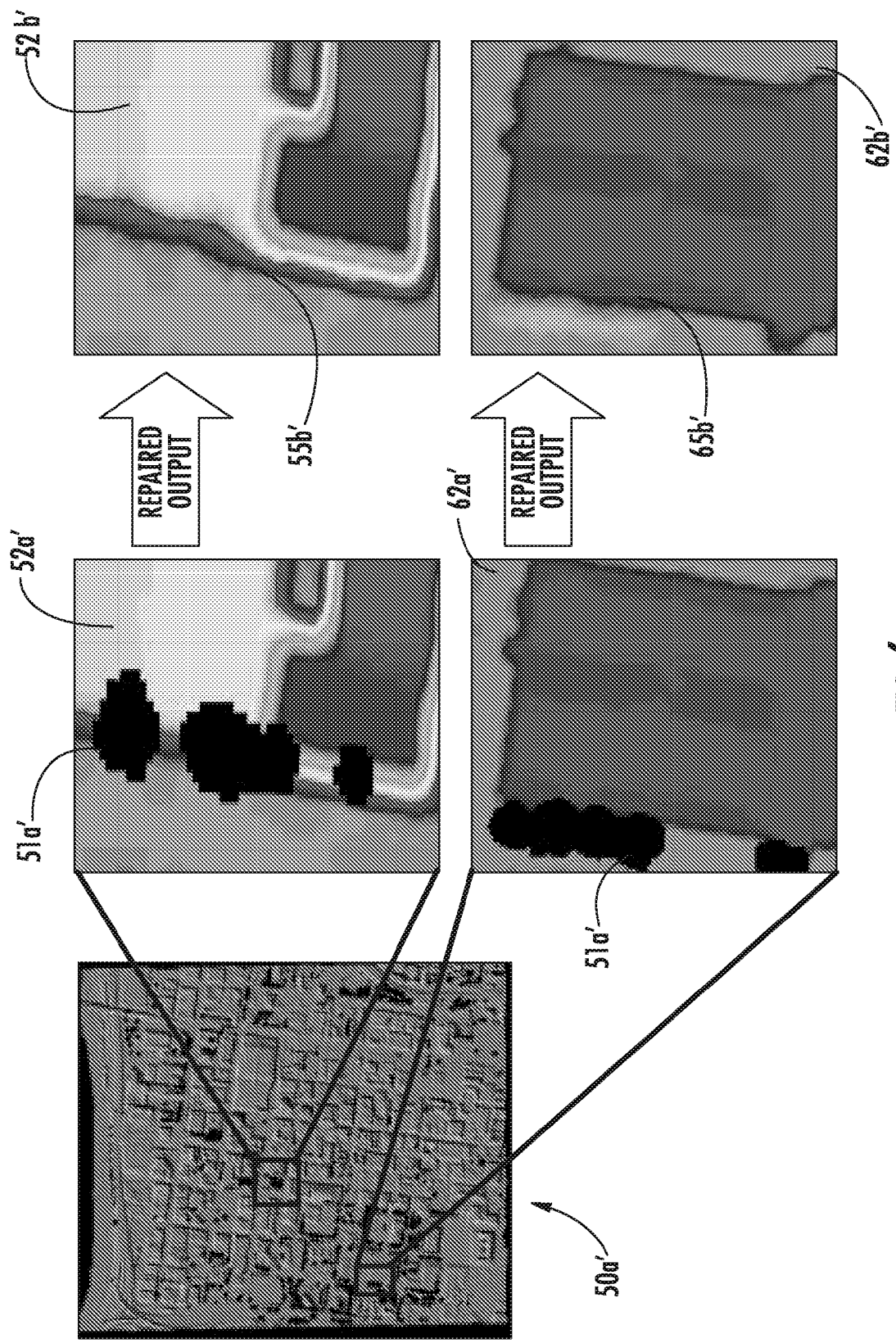
FIG. 6 is a view of geospatial model cultural feature data in a DEN before and after void inpainting in accordance with the method illustrated in FIG. 5.

The above-described approach may similarly be used to reconstruct other features besides terrain. More particularly, it may be used to perform inpainting on voids in a cultural feature (e.g., building) resulting from foliage, etc., that obscures part of the cultural feature. Turning now additionally to FIGS. 5-7, the processor 22 may cooperate with the geospatial data storage device 21 for inpainting data into one or more voids 51a in geospatial model cultural feature data 50a caused by the extraction of foliage (i.e., tree) data from the DEM, at Block 33'. By way of example, the foliage extraction may be performed based upon the color of the data (if color data is provided), as well as the color gradient of the data, as will be appreciated by those skilled in the art. Of course, other suitable foliage extraction techniques may also be used. Once again, the voids 51a may be determined based upon the location of the foliage that is extracted.

Figure 7A:
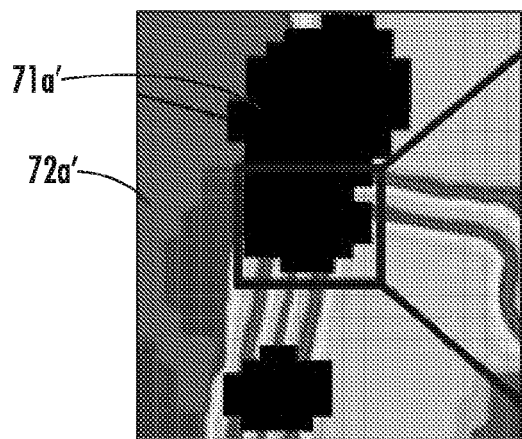
FIGS. 7A-7D are a series of close-up views of a void in geospatial model cultural feature data illustrating the inpainting technique used in FIG. 6 in greater detail.
Figure 7B:
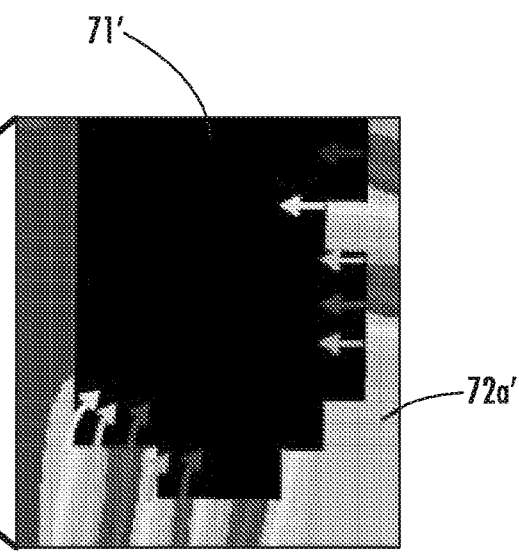
Figure 7C:
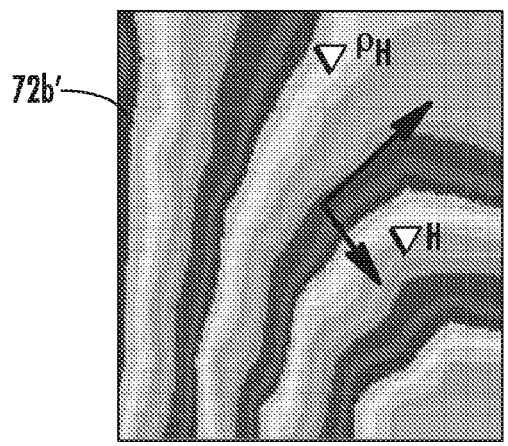
Figure 7D:
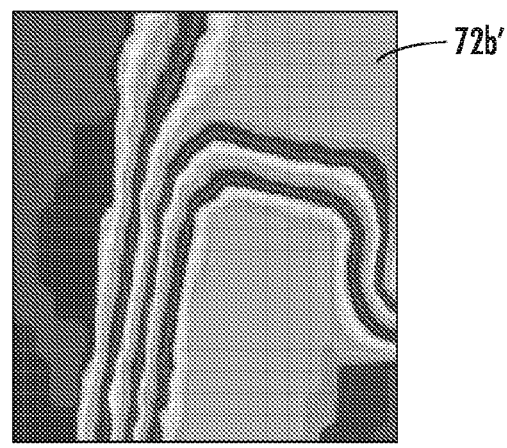
Figure 8:
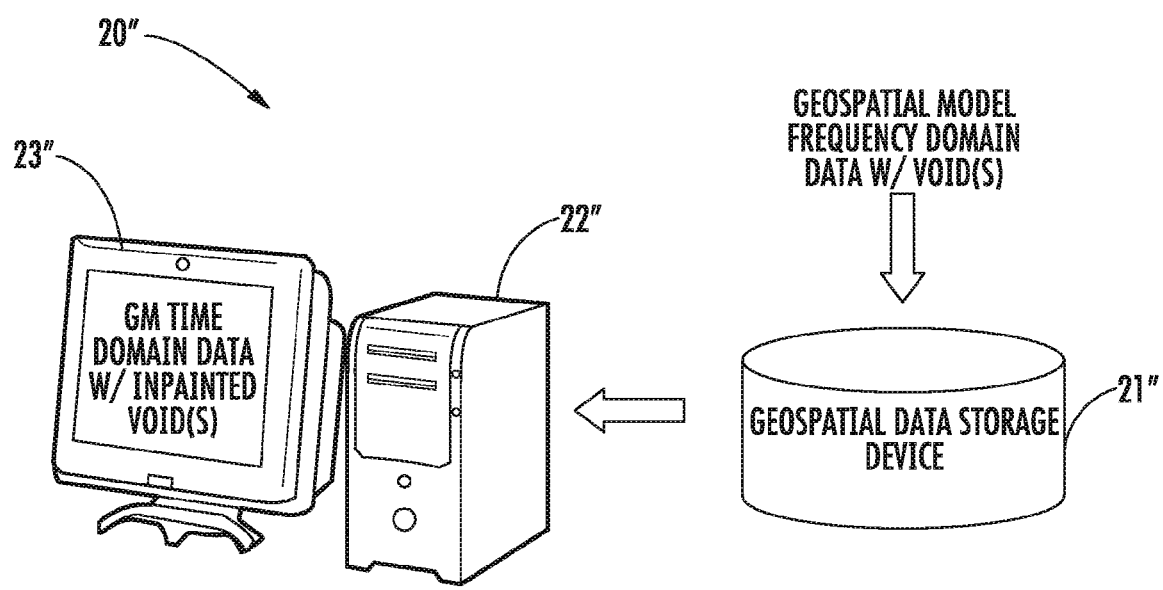
FIG. 8 is a schematic block diagram of an alternative geospatial modeling system in accordance with the invention for void inpainting within geospatial model frequency domain data.
Figure 9:
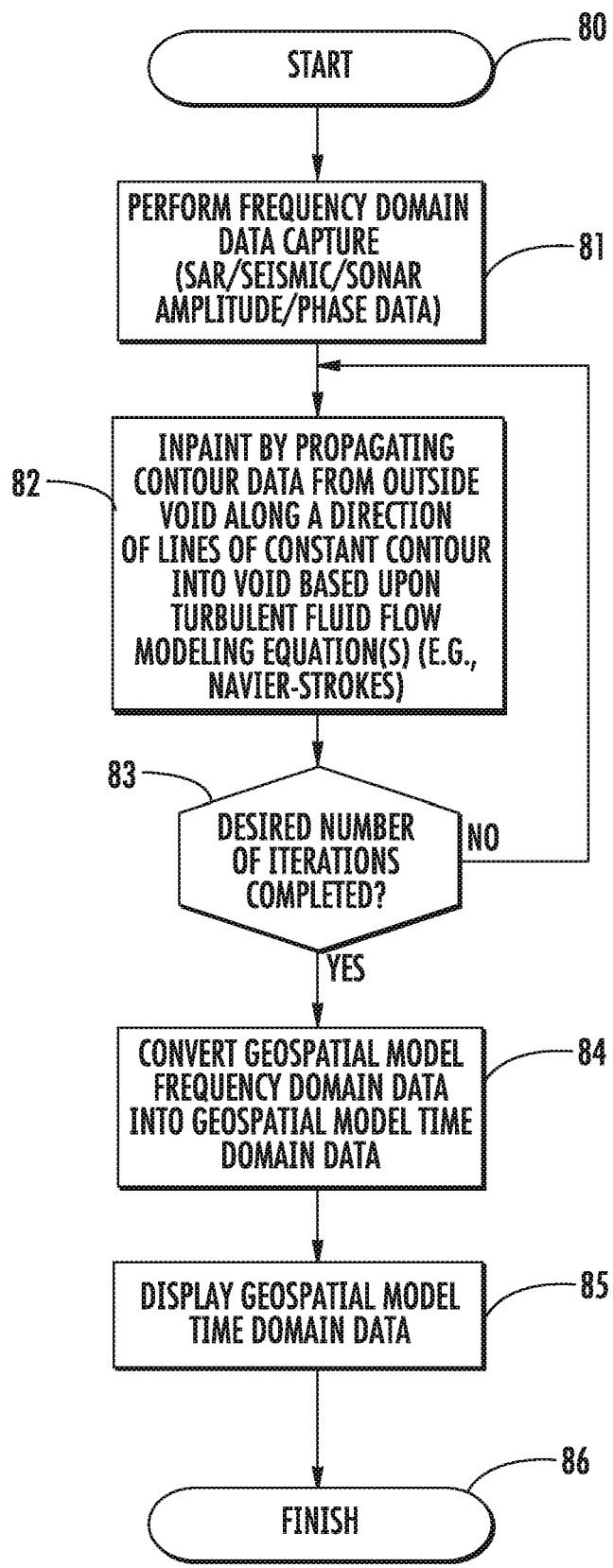
FIG. 9 is a flow diagram illustrating an alternative geospatial modeling method aspect of the invention for void inpainting within geospatial model frequency domain data.

As discussed above, the processor 22 inpaints by iteratively propagating elevation contour data from outside the voids 51a in data portions 52a, 62a along a direction of lines of constant elevation contour from outside the voids into the voids, at Blocks 35'-36', to produce the final "repaired" data portions 52b, 62b in which building edges 55b', 65b' are now complete and continuous. The inpainting process is further illustrated in FIGS. 7A-7D, in which elevation information (as visually represented by the different shading) from the bordering region of a data portion 72a around a void 71 is propagated into the void (FIGS. 7A and 7B) based upon the following relationship:

$$\frac{\partial H}{\partial t} = \nabla L \cdot N, \quad (3)$$

where $\nabla H$ is the DEM gradient and $\nabla^P H$ is the iso-contour direction to produce the repaired data section 72b (FIGS. 7C and 7D). Here again, the above-noted equation (2) may be used. This approach advantageously allows for the autonomous creation of high resolution DEMs of cultural features (e.g., buildings). Moreover, this may be done while maintaining building elevation consistency and edge sharpness of the identified inpainted regions.

Turning additionally to FIGS. 8 through 13, yet another system 20" for geospatial model frequency domain data to void inpainting is now described. Here again, the system 20" illustratively includes a geospatial data storage device 21", a processor 22", and a display 23" coupled to the processor, which may be similar to the above-described components. However, in this embodiment the geospatial data storage device 21" stores geospatial model frequency domain data for processing by the processor 22". By way of example, the frequency domain data may be captured using a SAR, SONAR, or seismic collection device, for example, as will be appreciated by those skilled in the art, at Blocks 80-81. The example that will be discussed below with reference to FIGS. 10-13 is based upon SAR frequency domain data.

Figure 10:
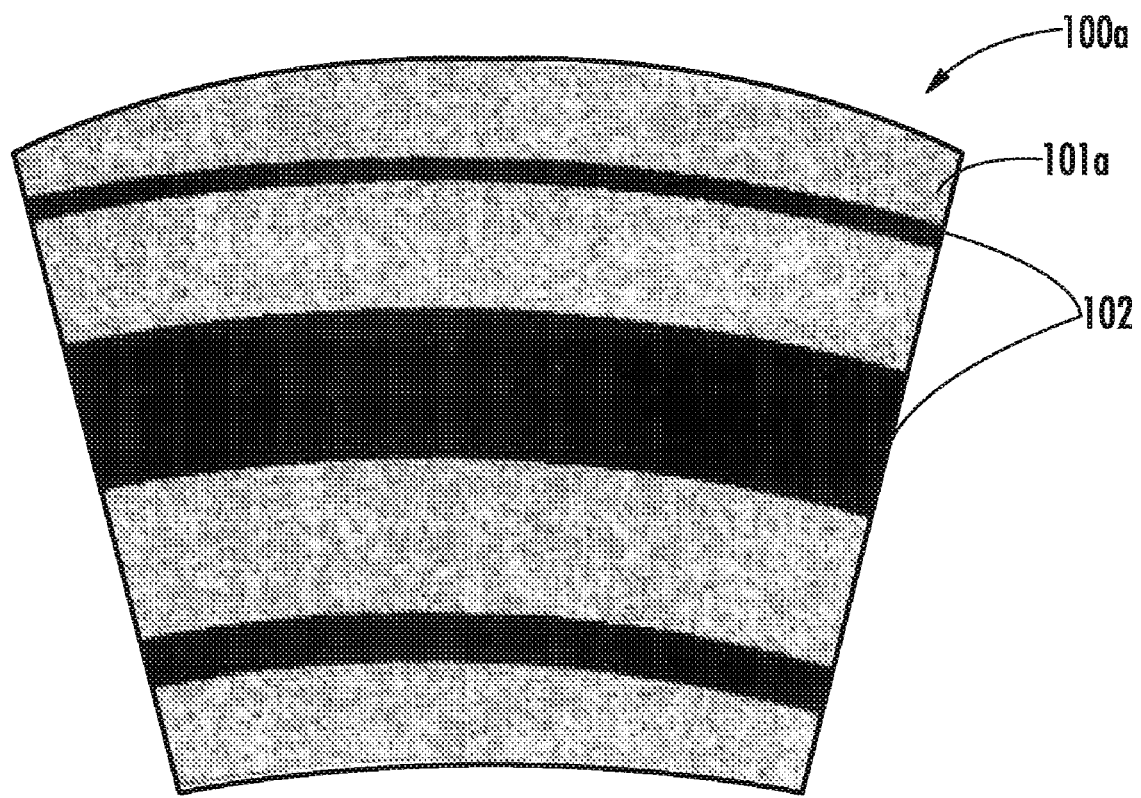
FIG. 10 is a K-space frequency domain representation of the U.S. Capitol building from a SAR with voids therein.
Figure 11:
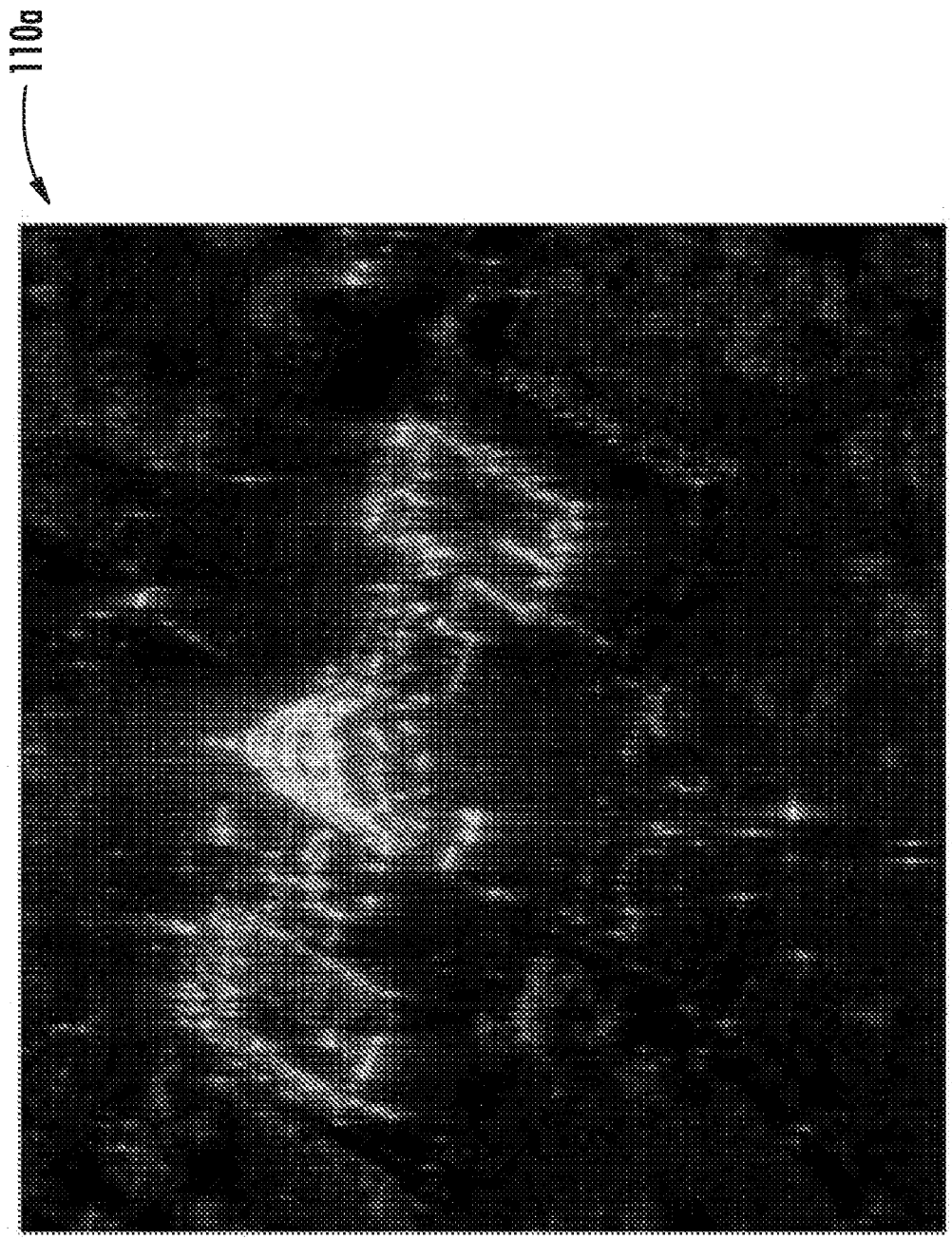
FIG. 11 is a time spatial equivalent image of the frequency domain data of FIG. 10.

More particularly, a frequency domain data map 100 illustrated in FIG. 10 is a K-apace representation of phase/amplitude data 101 from a SAR scan of the U.S. Capitol building. For purposes of the present example, certain bands 102 of phase/amplitude data have been removed from the phase map to represent the effects of missing frequency data. More particularly, such missing data bands 102 typically result from the notching of particular frequencies to avoid interference with other RF emitters, from hardware malfunctions that result in pulse dropouts, RF interference, etc. It should be noted that in the present example the bands 102 have been manually removed for illustrational purposes, and are not the result of notching, hardware malfunction, etc. The missing data bands 102 may therefore be treated as voids in the frequency domain data representation. The result of these voids is a blurred or distorted spatial domain representation of the SAR data 110a when converted to the spatial domain, as shown in FIG. 11. That is, the voids result in a degraded spatial domain image with a high multiplicative noise ratio (MNR), as will be appreciated by those skilled in the art.

However, the above-described inpainting techniques may also advantageously be used for repairing such voids in geographical model frequency domain data. More particularly, the processor 22" cooperates with the geospatial data storage device 21" for inpainting data into the missing data bands 102 (i.e., voids) based upon propagating contour data from outside the voids into the voids, at Block 82. More particularly, the propagation occurs along a direction of lines of constant contour from outside the voids into the voids. Yet, rather than being based on elevation contour data as in the above-described examples, here the contour data corresponds to the phase and amplitude values of the data surrounding the voids. Here again, the propagation is preferably iteratively performed a desired number of iterations (Block 83), or until a steady state is achieved, as will be appreciated by those skilled in the art.

Once again, this approach is based upon reconstructing data for frequencies that are missing from a frequency domain representation of a geographical area of interest by modeling the spectral signatures that are present in the data surrounding the voids as a turbulent (i.e., fluid) flow. That is, each individual known frequency is treated as a particle in an eddy flow, which are small turbulence fields inside of a general turbulence field. As such, the known "eddies" in the frequency domain data can therefore be modeled to interpolate the missing values.

Generally speaking, the processor 22" performs inpainting based upon one or more turbulent fluid flow modeling equations. By way of example, Navier-Stokes fluid mechanics equations/relationships may be used with some modification for K-space. More particularly, the stream function will have two components rather than one as follows:

$$\Psi = A(k_x, k_y)e^{z\phi(k_x,k_y)} = R(k_x,k_y) + zQ(k_x,k_y), \quad (4)$$

where the functions A, R, and Q are four times differentiable, and $z=\sqrt{-1}$. Thus, looking at the derived equations with respect to image intensities results in the following:

$$\frac{\partial}{\partial t}(\nabla^2 \Psi) + (v \cdot \nabla)(\nabla^2 \Psi) = v\nabla^2 \cdot (\nabla^2 \Psi). \quad (5)$$

A similar Navier-Stokes approach may also be used for the terrain/cultural feature void inpainting operations described above, as will be appreciated by those skilled in the art.

Figure 12:
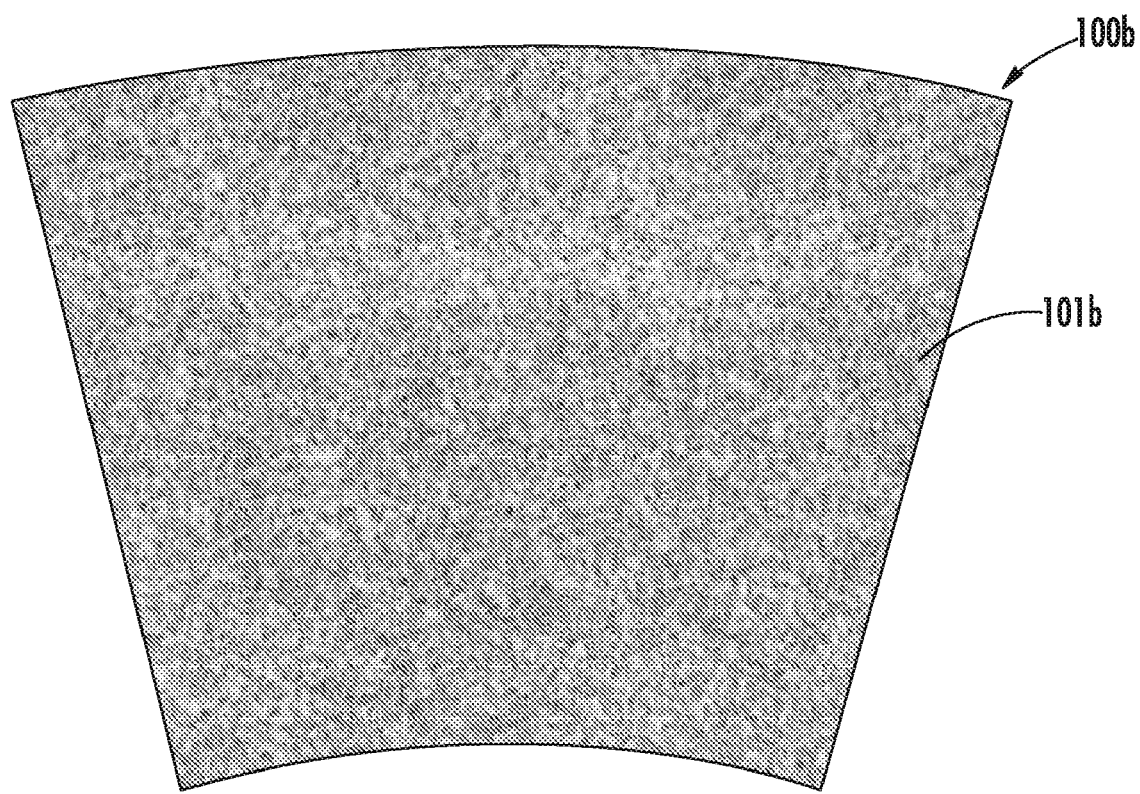
FIG. 12 is an representation of the K-space frequency domain data of FIG. 10 as it would appear after void inpainting in accordance with the method shown in FIG. 9.
Figure 13:
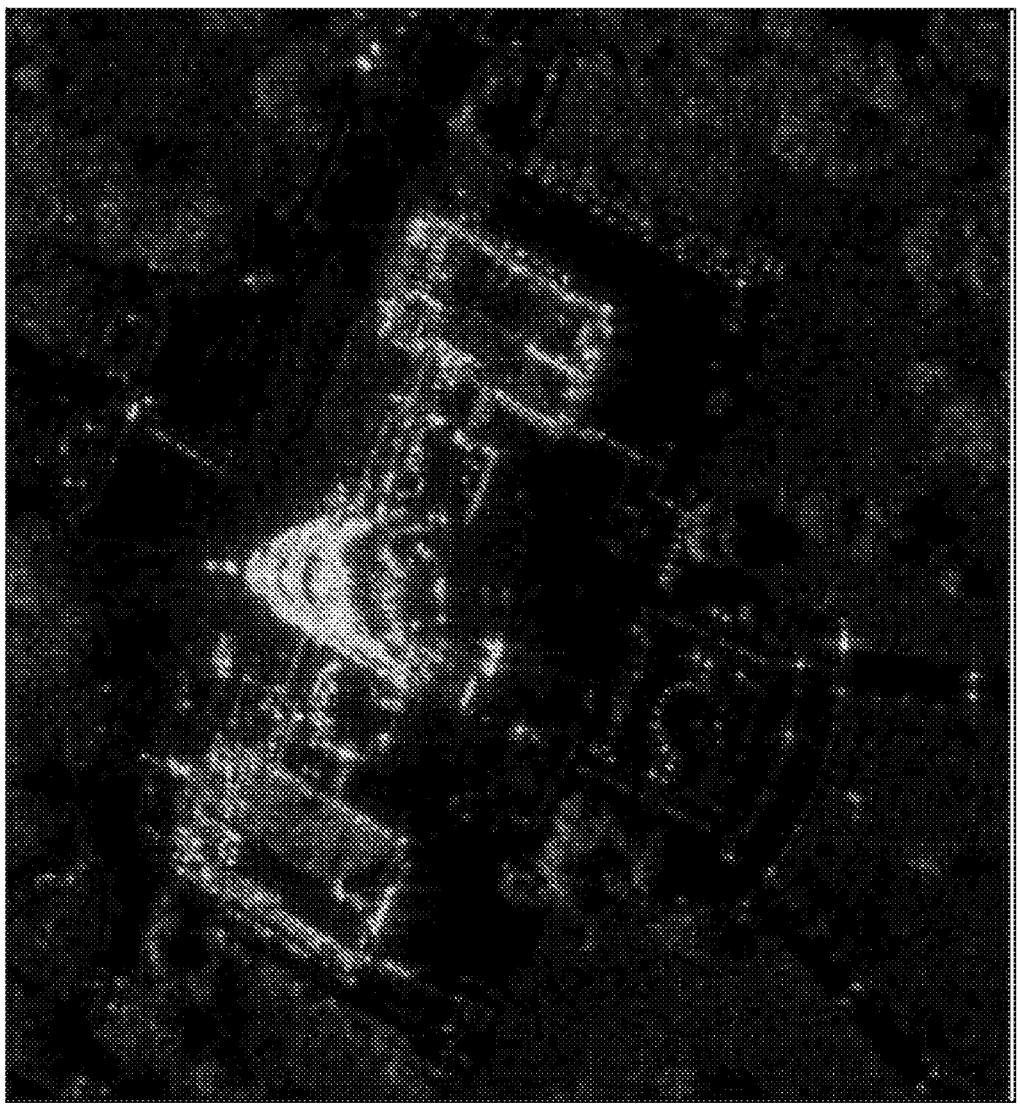
FIG. 13 is a spatial domain equivalent image of the frequency domain representation of FIG. 12.

After the iterative propagation is completed using the above-described approach, the K-space map 100b is "repaired" with the missing data bands 102a no longer present (or substantially diminished), as shown in FIG. 12, which when converted to the spatial domain (Block 84) provides the substantially less distorted spatial domain image of the Capital 110b shown in FIG. 13. Here again, it should be noted that the representation in FIG. 12 has not actually been repaired using inpainting techniques as described above; rather, this is an actual K-space representation of the Capitol building without any voids therein. However, applicants theorize that using the above-described approach will provide a close approximation of the representation 110b of FIG. 13, as will be appreciated by those skilled in the art. Once the inpainting is complete, the geospatial model spatial domain data may be displayed on the display 23", if desired, at Block 85, and/or stored in the geospatial data storage device 21", etc., thus concluding the illustrated method (Block 86).

Figure 14:
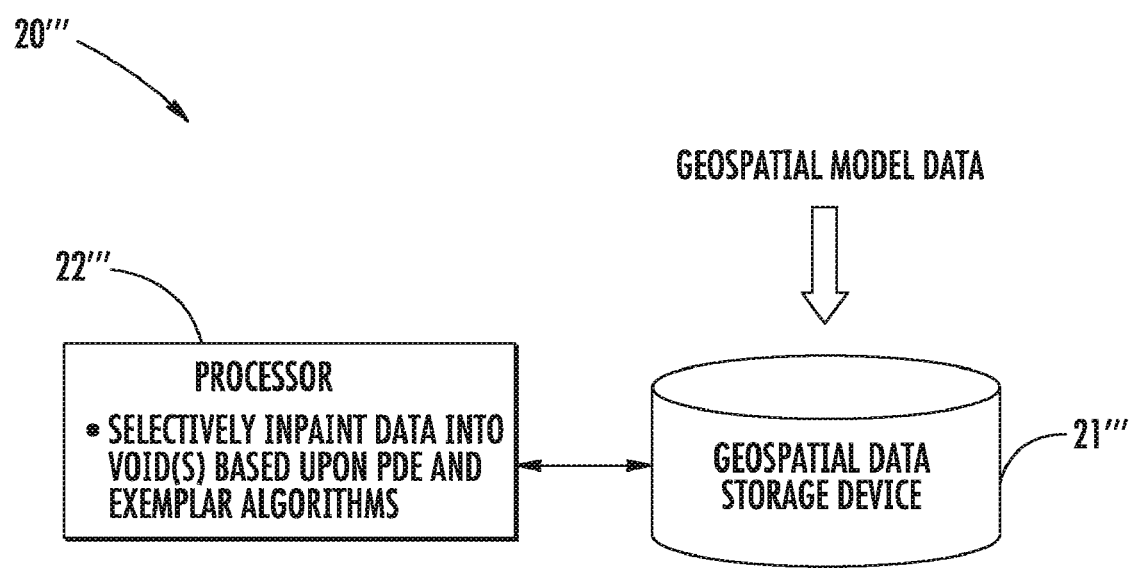
FIG. 14 is a schematic block diagram of an alternative geospatial modeling system in accordance with another aspect.

In accordance with another advantageous aspect now described with reference to FIG. 14, the geospatial modeling system 20''' may advantageously perform inpainting using both PDE-based and exemplar-based approaches. That is, the processor 22''' may selectively inpaint data into voids based upon PDE and exemplar inpainting algorithms, as will be discussed further below. However, before discussing how the processor 22''' selects between the different algorithms for inpainting, further details on an exemplar-based inpainting approach that may be used by the processor 22''' are first provided.

Generally speaking, exemplar inpainting is a patch-based texture synthesis approach that has a priority scheme for strong gradients in the scene. Exemplar inpainting fills in void regions, from the smallest to the largest, by systematically searching for the data that is the "best fit" in the input DEM. Unlike parametric approaches which have limitations based on the size of the void to be filled in and the smoothness, the exemplar method is well suited for removing large voids containing high frequency data in a scene.

Referring now to FIGS. 15A-15D, the exemplar algorithm is an isophote-driven image sampling process. There are several steps that go into inpainting a region $\Omega$. The boundary $\partial\Omega$ evolves inward, and the contour $\partial\Omega$ is the fill front. The object is to obtain data from somewhere that will fill in the region $\Omega$ of missing data (i.e., the void). The source region $\Phi$ is chosen as the region from which the fill data will be obtained. It should be noted that the source region $\Phi$ may come from different locations from within the image, or from other images, such as a duplicate image of the scene, in some embodiments.

To perform an iteration of exemplar-based inpainting, a point p is first identified. In the illustrated embodiment, a square template (i.e., patch) is obtained about the point p, where the patch is designated as $\Psi_p \in \Omega$. A statistical approach is employed to find a patch $\Psi_q \in \Phi$ (centered at $\hat{q}$ which is most similar to those parts already filled in $\Psi_p \in \Omega$, as will be appreciated by those skilled in the art. It should be noted that the search space that is required to find the completely filled in template $\Psi_q \in \Phi$ may be varied.

A potential drawback of template-based exemplar inpainting is its ability to handle linear features. Criminisi, et. al in a presentation entitled "Object Removal by Exemplar-based Inpainting," June 2003 Madison, Wis. Proc. IEEE Computer Vision and Pattern Recognition, describe a scheme for assigning patch priority. The order of filling in the patches is significant. Criminisi et al. proposed that given a patch $\Psi_p$ centered at p for some $p \in \partial\Omega$, its priority P(p) is defined as the product of two terms, that is: P(p)=C(p)D(p). C(p) is the confidence term, and D(p) is the data term, which are defined as follows:

$$C(p) = \frac{\sum_{w \in \Psi_p \cap \bar{\Omega}} C(q)}{|\Psi_p|}, \text{ and}$$

$$D(p) = \frac{|\nabla I_p^\perp \cdot n_p|}{\alpha},$$

where $|\Psi_p|$ is the area of $\Psi_p$, $\alpha$ is a normalization factor (e.g. 255 for a typical gray value image), and $n_p$ is the unit vector orthogonal to the front $\partial\Omega$ in the point p.

The priority is computed for every border patch, with distinct patches for each pixel on the boundary of the target region $\Omega$. During initialization, the function C(p)=0 $\forall p \in \Omega$, and C(p)=1 $\forall p \in I-\Omega$. The confidence term C(p) can be thought of as a measure of the amount of reliable information (i.e., pixels) surrounding the point p. The goal is to first fill in pixels in those patches which have more of their pixels already filled, with additional preference given to pixels that were filled in earlier. The term D(p) is a function of the strength of the isophotes hitting the front $\partial\Omega$ at each iteration. The term encourages patches that contain linear features to be filled in first along the front. Therefore, this algorithm encourages a patch-based infilling technique that handles structural and high-frequency content at the same time.

Figure 16A:
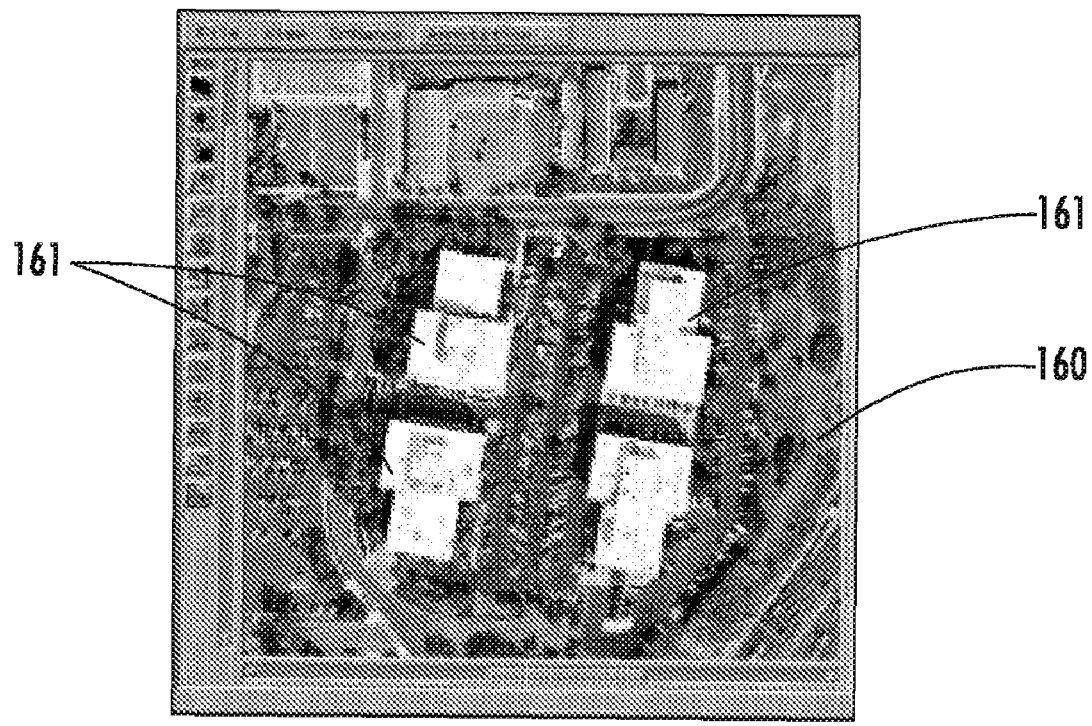
FIG. 16A is an optical view of a scene.
Figure 16B:
FIGS. 16B-16E are a series of corresponding nadir views of the same scene in DEM format before and after void inpainting using the exemplar approach illustrated in FIGS. 15A-15D.
Figure 16C:
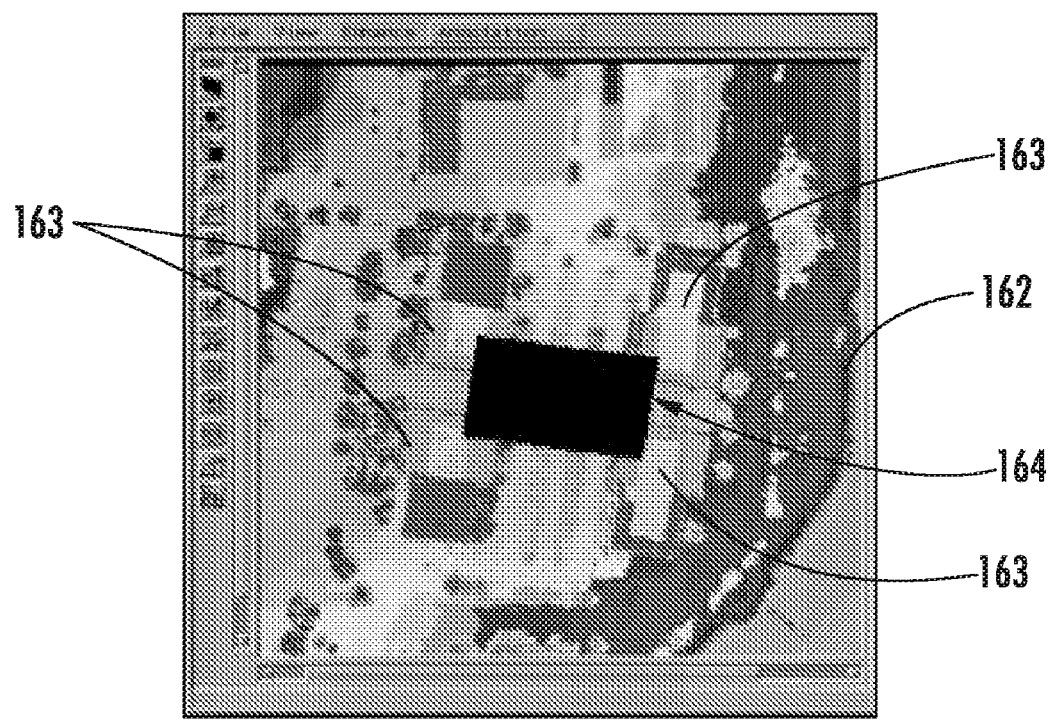
Figure 16D:
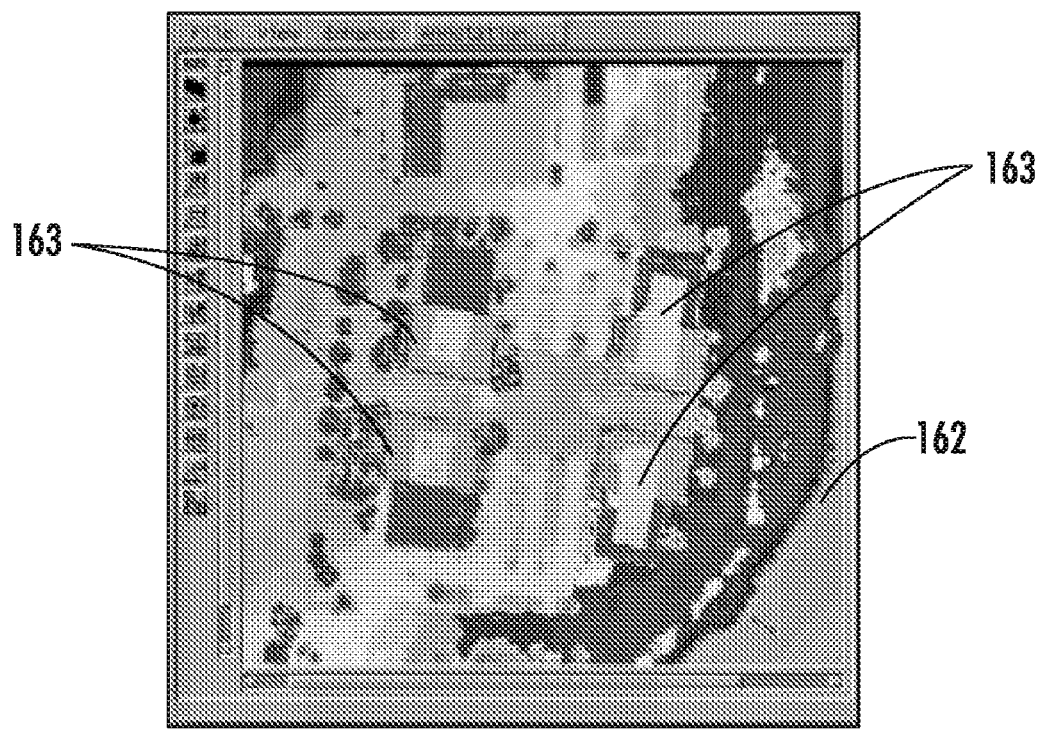
Figure 16E:
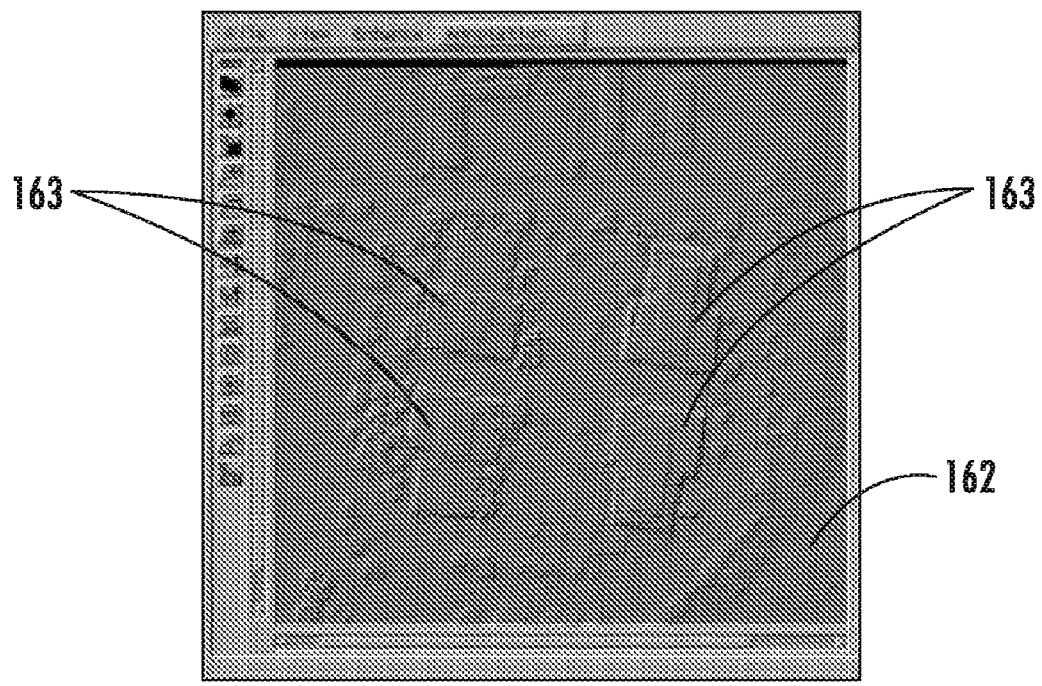

The above-described exemplar-based approach may be implemented using the processor 22''' to perform geospatial model creation. As seen in the example presented in FIGS. 16A-16E, the exemplar inpainting technique may be used to replicate even high frequency data. In the present example, a nadir optical image view of a scene 160 including buildings 161 is shown in FIG. 16A for reference, and a corresponding DEM 162 of the scene including buildings 163 is shown in FIG. 16B. In FIG. 16C, a sample void region 164 is removed which encompasses four building corners and an intersection therebetween. The void region 164 is reconstructed using the above-described exemplar inpainting technique, and the results are shown in FIG. 16D. A shaded output view of the inpainted DEM 162 is shown in FIG. 16E.

Although the void region 164 is manually removed in the present example, it simulates a relatively severe missing region from collected geospatial data (e.g., LIDAR data, etc.). Yet, as seen in FIGS. 16D and 16E, the exemplar inpainting approach implemented by the processor 22''' is able to reconstruct the high frequency building edges and complete the DEM 162. This advantageously enhances the ability to produce automated site models.

Figure 22:
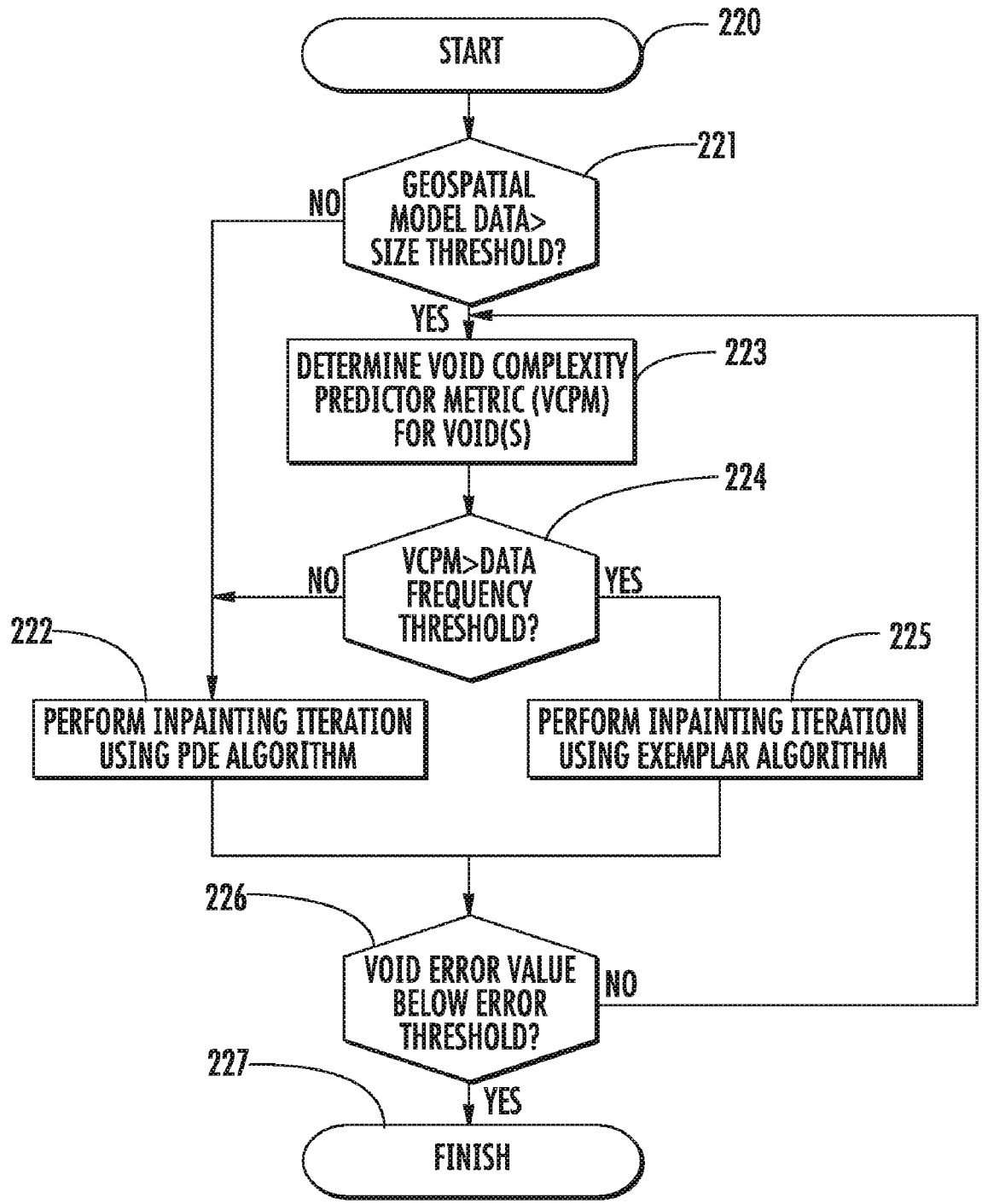
FIG. 22 is a flow diagram illustrating void inpainting method aspects using both PDE-based and exemplar-based inpainting in accordance with the invention.

An automated selection or switching process for selecting whether to inpaint using a PDE-based algorithm or an exemplar-based algorithm is now described with reference to FIG. 22 and begins at Block 220. The selection approach is designed to leverage the benefits of both approaches, while at the same time mitigating the respective shortfalls of these two approaches (PDE-based vs. exemplar). That is, the selection approach chooses the inpainting approach that provides the best results for the given conditions of the void to be inpainted.

Generally speaking, when it can be applied with suitable results the PDE-based inpainting scheme is preferred. The reason is that this approach is typically faster, meaning a satisfactory level of convergence can usually be achieved earlier than searching and doing comparative statistical analysis on possible patch candidates throughout the DEM (i.e., faster than exemplar inpainting). Also, there are cases where the possible candidates for exemplar filling are limited by a small DEM size or extreme void coverage. Thus, in these cases the processor 22''' may select the PDE-based algorithm if the size of the geospatial model data is less than a size threshold (Block 221). That is, the relatively small size of the geospatial model data does not permit adequate selection of exemplar inpainting source regions, for example. PDE-based or parametric inpainting is less susceptible to this shortcoming of exemplar-based inpainting because it only requires data from its boundary region and is therefore not reliant on the state of other, more remotely-located data in the input to produce satisfactory results. Moreover, the output product of PDE-based inpainting in many situations is very aesthetically pleasing due to the smoothing aspect of the diffusion component.

Figure 17A:
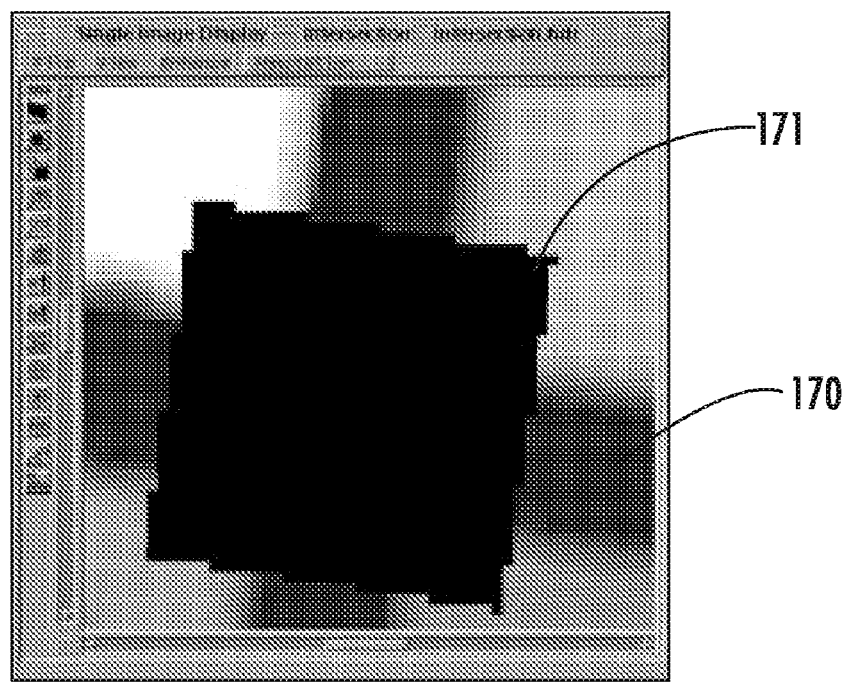
FIG. 17A is a close up view of a void in geospatial model data.
Figure 17B:
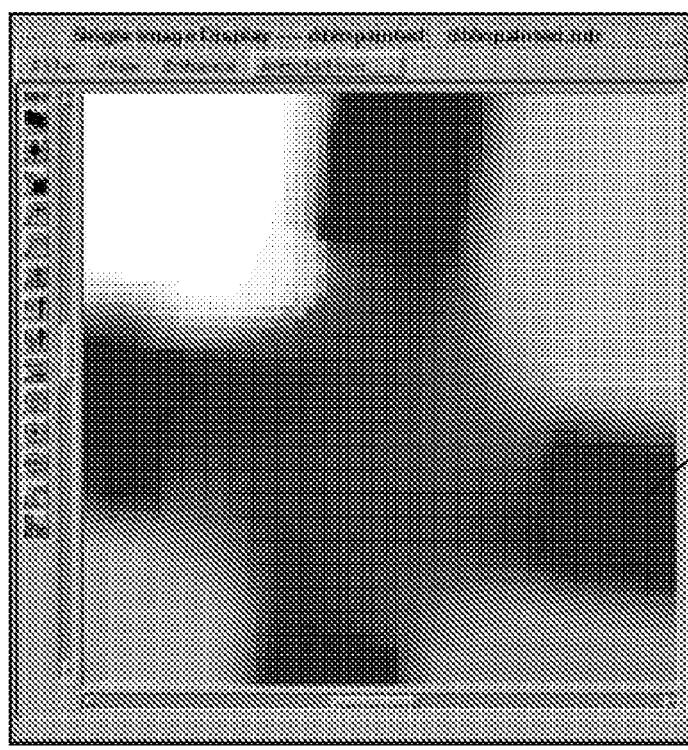
FIGS. 17B and 17C are close up views of the geospatial model data after inpainting using PDE and exemplar inpainting approaches, respectively.
Figure 17C:
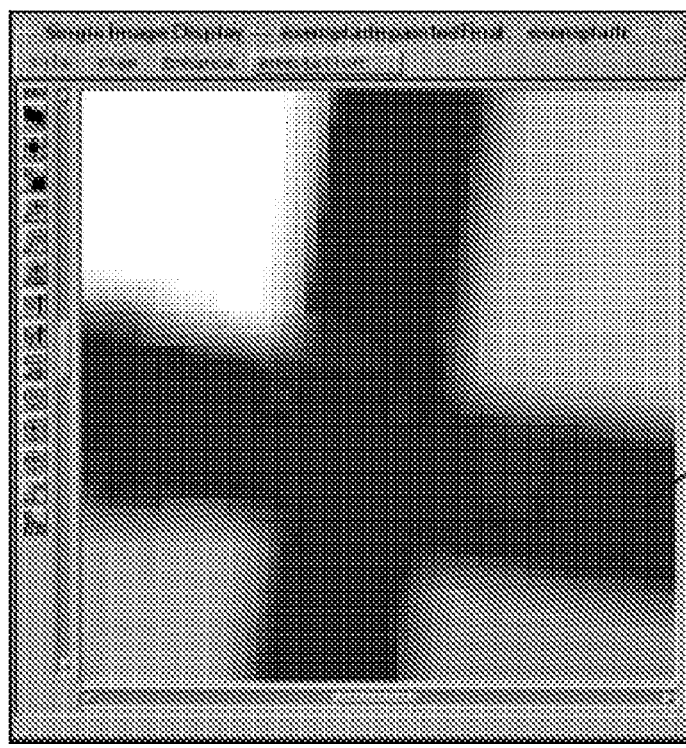

However, the diffusion term of the parametric inpainting algorithm is also a significant reason for the need to add exemplar inpainting into the production flow. The PDE-based inpainting method smoothly propagates data from the boundaries into the voided area of interest. Therefore, it is undesirable for this approach to be applied to high frequency data (e.g., rocky/mountainous terrain, building edges, etc.). Thus an exemplar-based texture replication approach would better model the problem. Moreover, in real world settings high frequency data tends to be replicated in other areas within the same geographical location. The exemplary search space approach takes full advantage of this relationship, and uses this data to piece together the missing voided region. This is demonstrated in FIGS. 17A-17C. In particular, FIG. 17A shows an intersection in a DEM 170 with a void 171 therein, FIG. 17B shows the DEM 171' after inpainting using a PDE-based approach, and FIG. 17C shows the DEM 171" after inpainting using an exemplar-based approach.

In accordance with one exemplary embodiment, the inpainting algorithm selection process begins by running exemplar inpainting on the input DEM over each of the void regions, from the smallest to the largest (although other orders may be used), which have been automatically detected. The goal of this step for each void is to handle the inpainting until a point is reached when all high frequency data has been filled in, and the remaining void boundary consists of data below a data frequency threshold, at Blocks 223-225. Stated alternatively, the exemplar-based algorithm is used as the "default" inpainting algorithm for each void until a void complexity predictor metric therefor falls below the data frequency threshold, at which the processor 22''' switches to or selects the PDE-based algorithm for inpainting.

For each iteration of the exemplar patch-based fill, the decision on which patch (formed around one of the boundary points) is the next to be filled may be based on a two-part priority scheme. The portion of the priority scheme that can be used to determine, without any extra computation, when the high frequency content has been removed is referred to as the data priority. By thresholding this value the exemplar inpainting may be used up until an appropriate stopping time, at each boundary point, namely when there are no longer any significant linear structures flowing into the region, as will be appreciated by those skilled in the art.

Another condition that may be used to cause a switch from exemplar inpainting to PDE-based inpainting is lack of a suitable patch candidate. Generally speaking, the processor 22''' determines whether to select the PUE-based algorithm instead of the exemplar based algorithm based upon an error level of a candidate exemplar source fill region. More specifically, upon comparison, an error score function may be computed for each possible candidate in the search space. A threshold is also set for this value and, if it is not met by the best candidate found (i.e., the one with the lowest score), the choice will be made to switch inpainting methods, i.e., to select the PDE-based inpainting algorithm instead of the exemplar-based algorithm. This protects against the undesirable case that can happen with exemplar-based inpainting in which a bad patch selection is made early in the processing that is then built upon, compounding the overall error. This also helps avoid the limited data/majority void search space situation presented above.

At this point the remaining unfilled portions of the original void region(s) are in a good position to take advantage of the benefits of the parametric PDE-based inpainting techniques described above. With no high frequency input to disturb the bordering data, the values for the remaining sections can flow in from the boundary using the partial differential equations approach discussed above. The system 20''' therefore takes advantage of the positive aspects of each inpainting method, while reducing potentially negative consequences from using either method exclusively by itself. The iterative inpainting operations may continue until a stopping value associated with the given void is below an error threshold, i.e., based upon an inpainting stopping metric, at Block 226, thus concluding the method illustrated in FIG. 22 (Block 227). Further details on inpainting stopping metrics are provided in copending U.S. application Ser. No. 11/858,270, which is assigned to the present Assignee and is hereby incorporated herein in its entirety by reference. It should be noted that in some embodiments the processor 22''' may switch back and forth between the two inpainting algorithms multiple times, and that exemplar inpainting need not always be used as the starting or "default" inpainting approach.

Figure 18A:
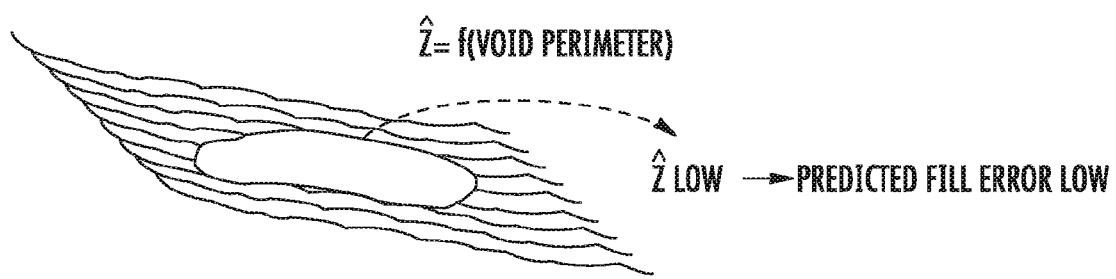
FIGS. 18A and 18B are schematic views of voids in geospatial model data having low and high void complexity predictor metrics as determined by the system of FIG. 14.
Figure 18B:
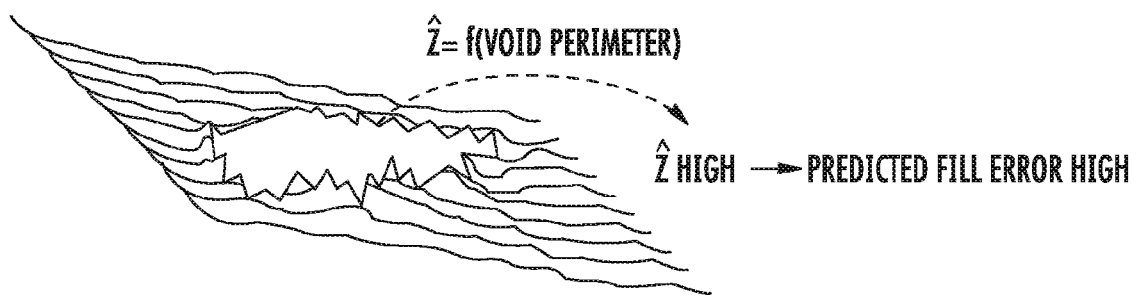
Figure 19:
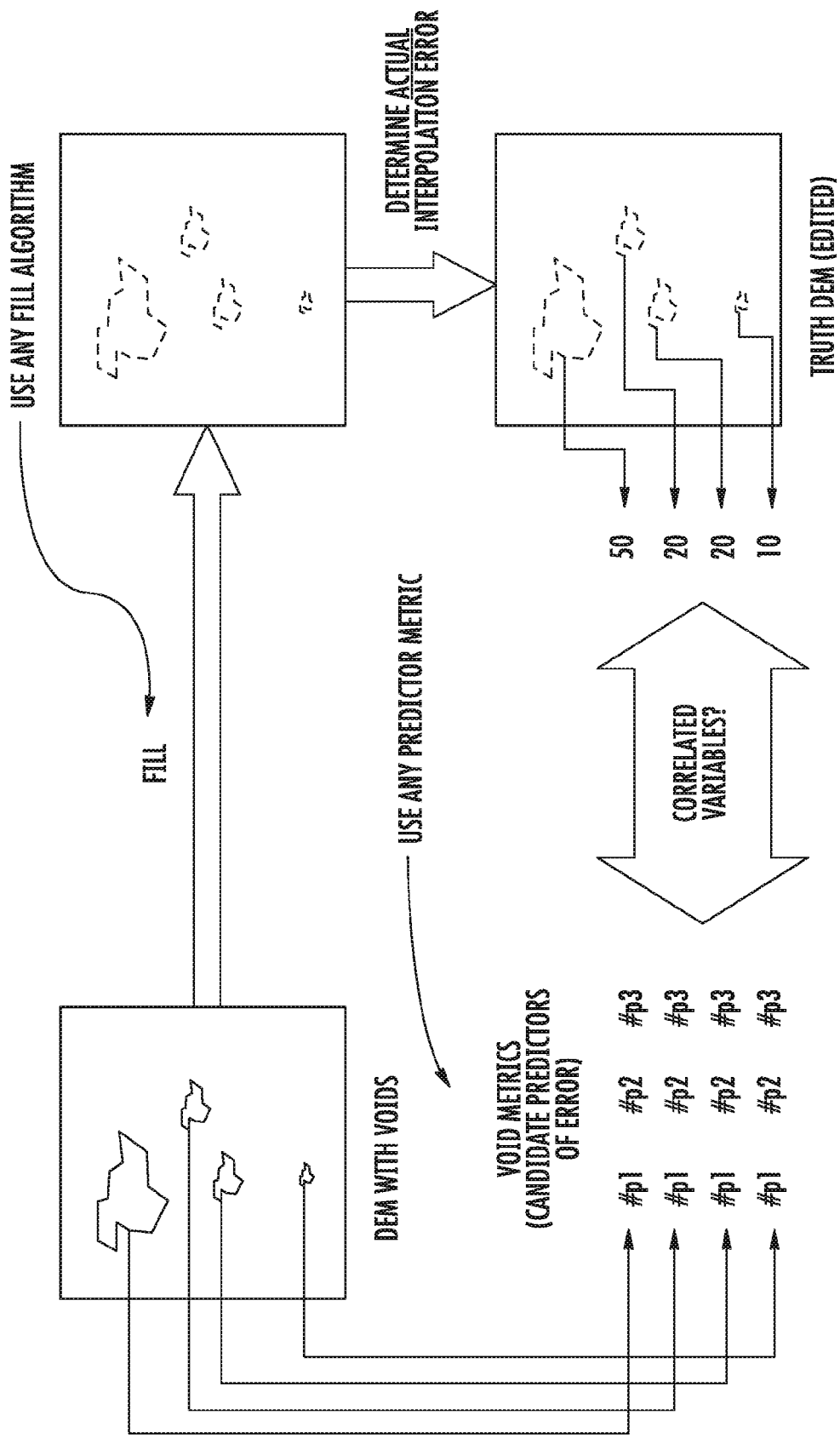
FIGS. 19 and 20 are schematic diagrams illustrating predictive error concept analysis and calibration operations performed by the system of FIG. 14 with and without the use of reference or truth data, respectively.
Figure 20:
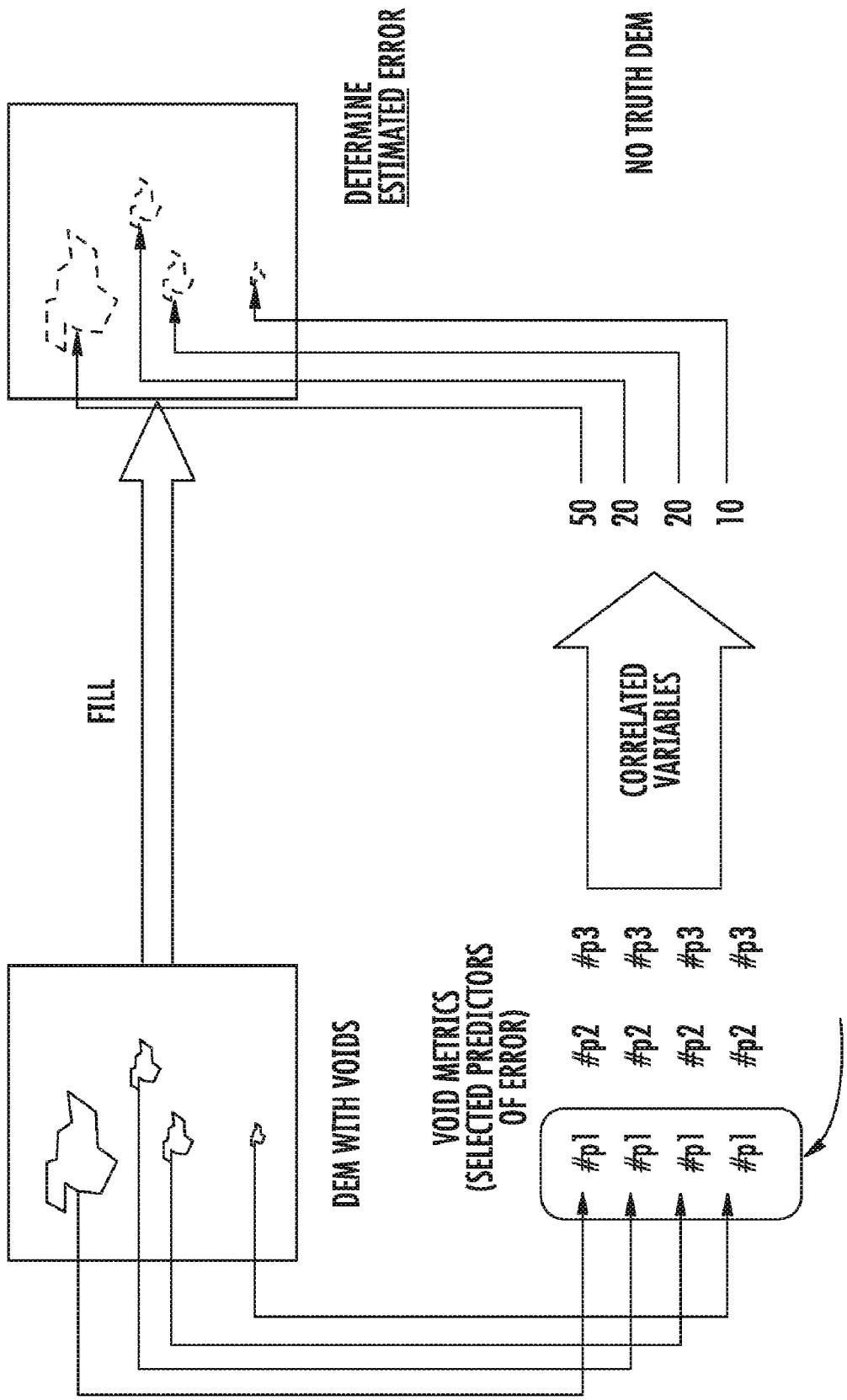

Turning now additionally to FIGS. 18-20, an exemplary void complexity predictor metric determination processes is now described. The value of the void fill (reconstructed bare earth, for example) depends on how accurately the fill estimates or approximates truth (i.e., reference) data for the void region. The computation of the accuracy of void fill may not be possible where void fill techniques are used that do not require truth data for the void regions. However, an error associated with the void fill may be estimated based on prior knowledge of how the given technique performs with voids where truth data is available.

More particularly, to build a model for estimating the error in a void fill, void complexity predictor metrics are first defined based on characteristics of the void perimeter. These metrics can include a variety of measures of the complexity of the void. One example of a void complexity predictor metric is a measurement of the frequency of the data surrounding the void, as seen in FIGS. 18A and 18B.

Training data sets may be identified that can be filled using the above-described void fill technique, and files for the same areas containing truth data may also be identified/created. The training data sets selected preferably provide a variety of void complexity conditions. The truth data is preferably either a void-free data set for the area or a dataset that has been filled and manually verified/edited, as will be appreciated by those skilled in the art.

A fill predictive (bounded) error concept analysis and calibration/training example is illustrated in FIG. 19. A training phase is defined where data is collected for a suite of void complexity predictor metrics for each void. The predictors may then be statistically correlated and calibrated using truth data to determine which are the best predictors of fill accuracy, as shown in FIG. 19. The calibrated predictors are then used for estimating the accuracy of fills for fill regions without truth data, as shown in FIG. 20, which illustrates the fill predictive (bounded) error concept application to a cell with no truth data.

Figure 21A:
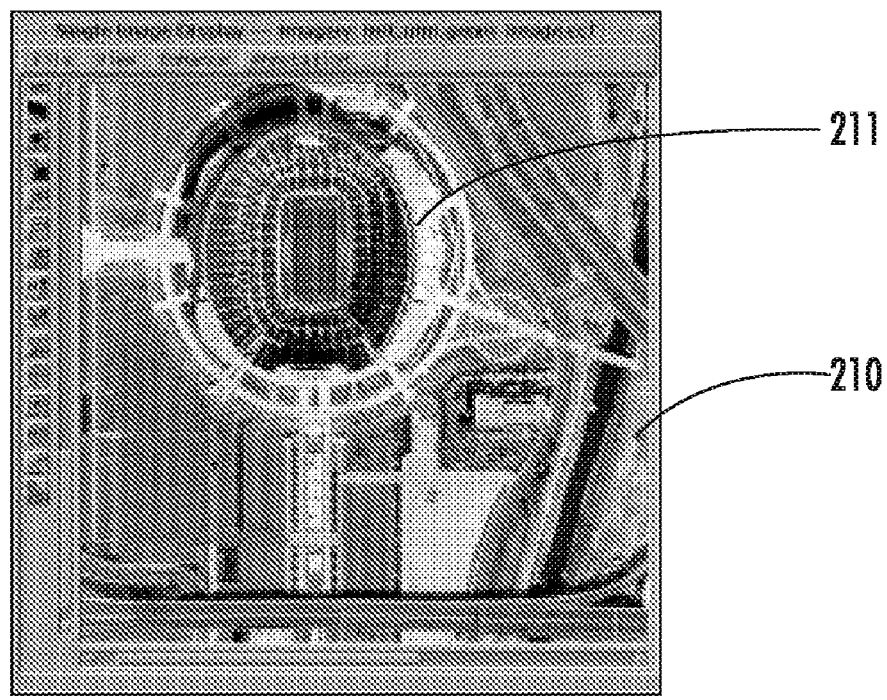
FIG. 21A is an image of Invesco Field in Denver, Colo.
Figure 21B:
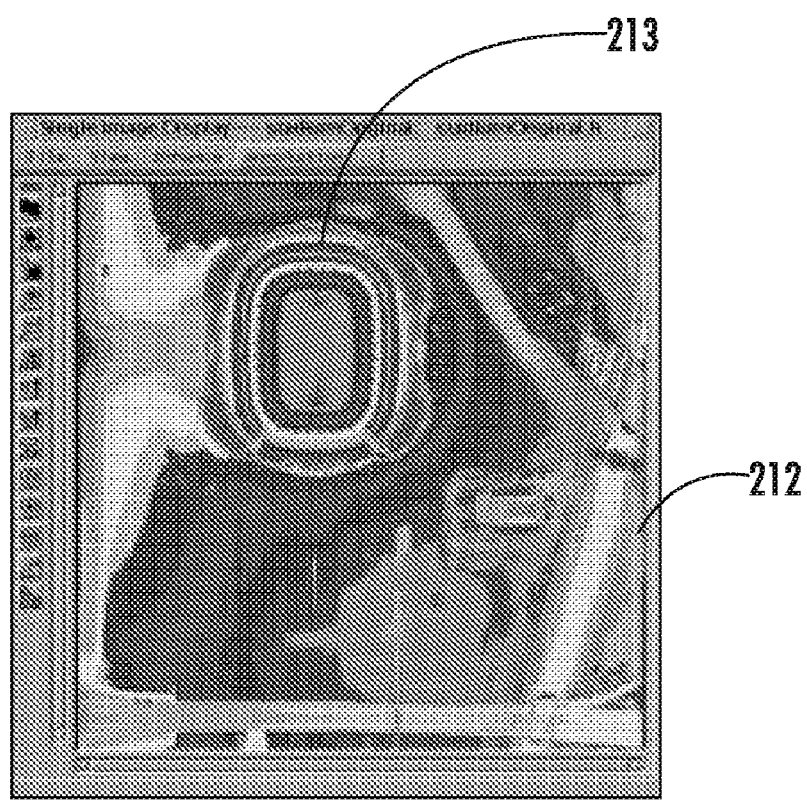
FIGS. 21B-21F are a series of DEM views of the same scene illustrating void inpainting using both PDE-based and exemplar-based inpainting by the system of FIG. 14.
Figure 21C:
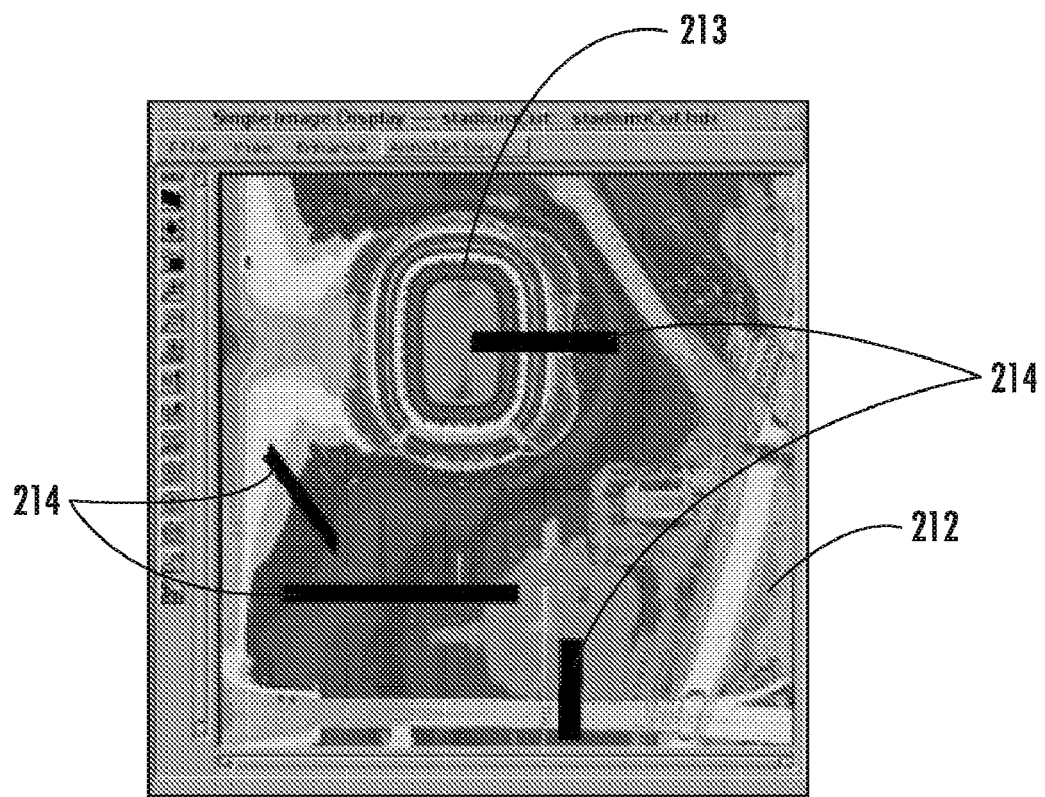

Simulated results of the above-described inpainting process using both exemplar and PDE-based techniques are now provided with reference to FIGS. 21A-21F. The data set demonstrated in FIGS. 21A-21F is of Denver, Colo., and more particularly Invesco Field and the surrounding area, with an area of 1.84 square kilometers and 1 m post spacing LIDAR points. The original input scene 210 and stadium 211 is shown in FIG. 21A (in image form), and the corresponding DEM 212 and stadium 213 are shown in FIG. 21B. Void regions 214 are introduced to simulate missing or compromised geospatial model data (FIG. 21C). As would occur in a typical use case, the voids 214 are selected to encompass various types of regions present in the input (e.g., the stadium 213, hills, a bridge, etc).

Figure 21D:
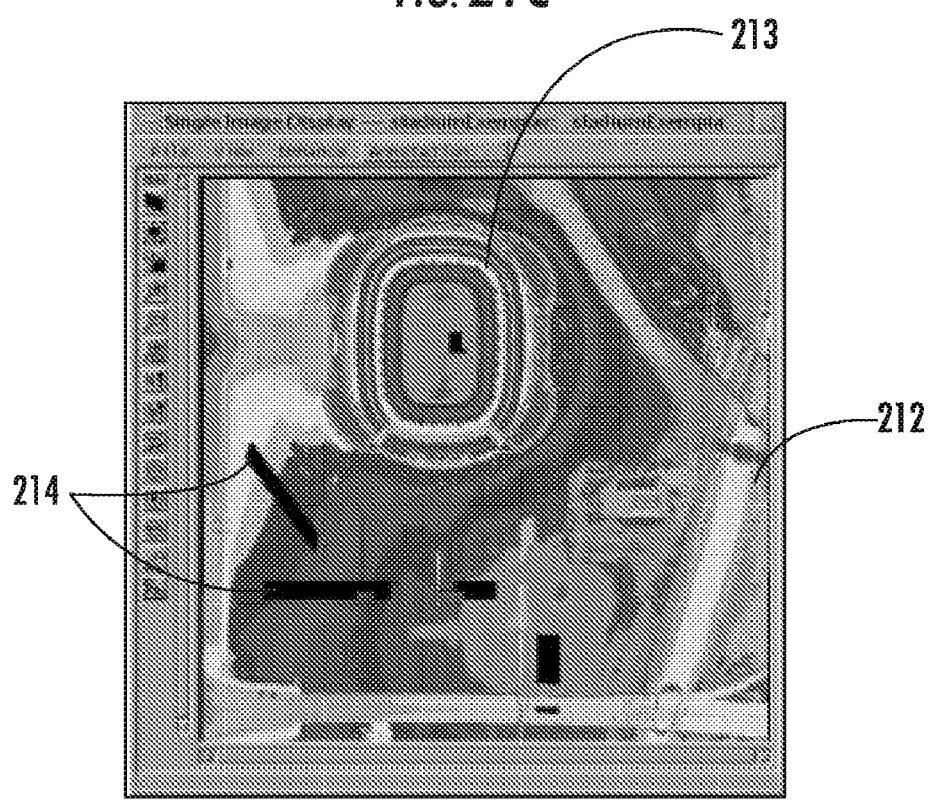

For each void region, exemplar inpainting is used to fill the void region until the void complexity predictor metric falls below the given data frequency threshold selected, as discussed above. The intermediate output up to this point is shown in FIG. 21D. At this point, all of the relatively high frequency portions of the void regions have been inpainted.

Figure 21E:
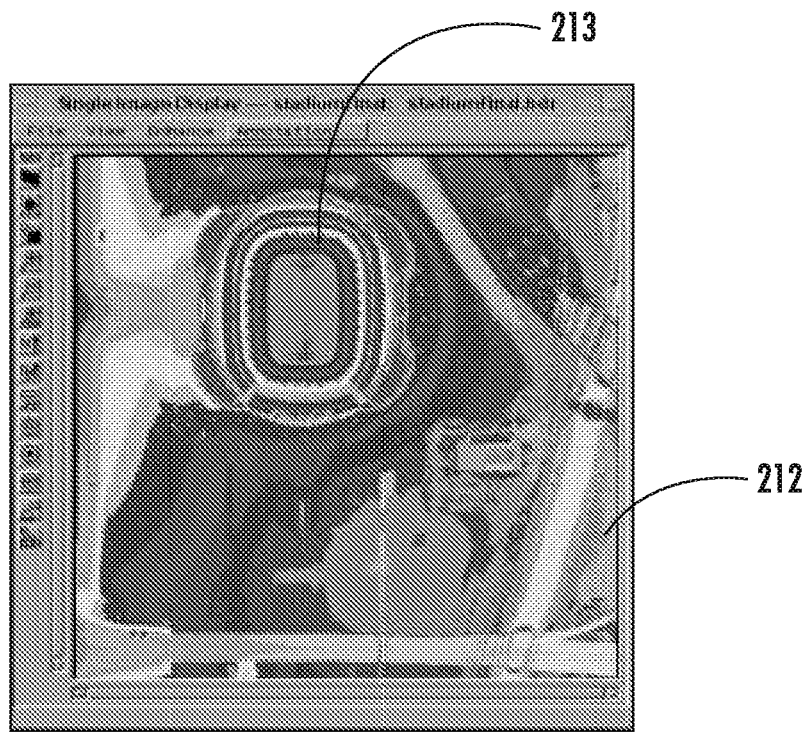
Figure 21F:
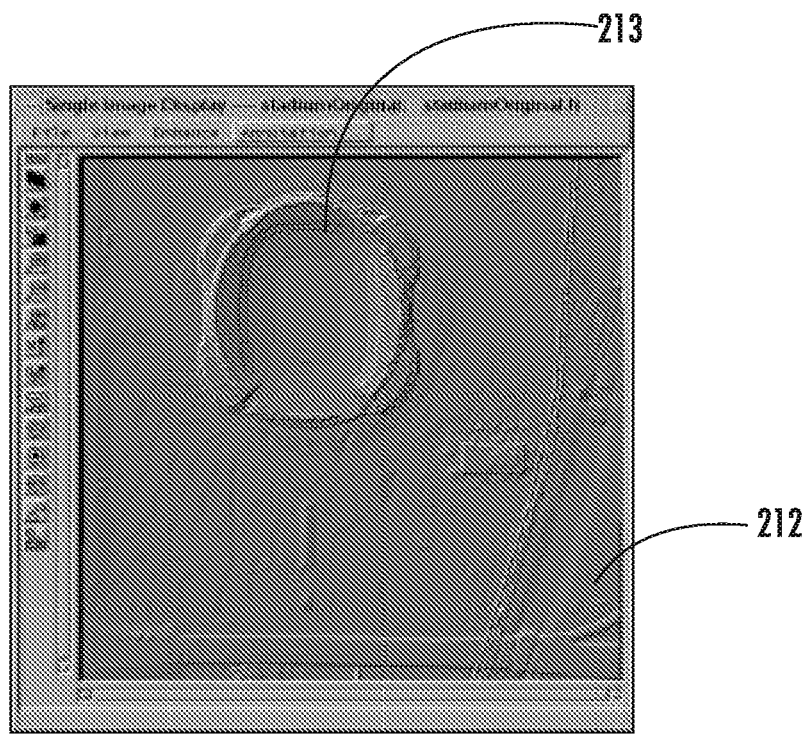

Of note, those voids 214 encompassing substantially bare earth (i.e., flat terrain) receive little or no exemplar-based inpainting due to the absence of any high frequency data at their respective boundaries. At this point, the system then completes the inpainting by using a partial differential equation approach to "flow" in data from the surrounding boundary points into the remaining voids. The results are shown in FIGS. 21E and 21F (FIG. 21F is a shaded relief of the DEM of FIG. 21E).

In accordance with one exemplary implantation, the processor 22''' may read a list of 3D LIDAR or IFSAR points (usually several million). A competitive filter is used to take an unordered list of LIDAR points and generate an equally spaced DEN at a given resolution. Alternatively, optical imagery may be correlated to create the DEM, as will be appreciated by those skilled in the art. The buildings and trees may then be extracted to a separate DEM from the ground, and may be further separated from one other, if desired. The remaining ground data then has all of the resulting missing data filled using the above-described approach to complete a full bare earth DEM with edge contours propagated. Filtering may then be performed to remove any noisy LIDAR returns.

A line following algorithm followed by a multi-stage generalization algorithm may then be used to apply 3D chord points, to be used as polygon vertices, to the rooftop features. The sides of the buildings may then be extruded straight down to the void-filled bare earth from the rooftops. The accuracy of this stage of the process is dependent on the accuracy of the void filling of the inpainting process. The vertices from the building roofs and sides, as well as the ground surface, may be mapped into polygons and projected into geo-spatial coordinates. Textures may then be automatically applied to their corresponding polygons.

As will be appreciated by those skilled in the art, it is common to experience void regions resulting from data collection and processing. These void regions typically appear in various size strips and are located throughout the input DEN to be used to create the geospatial model. As such, there is often a mix of high and low frequency areas missing in each of these missing areas (e.g., missing building fragments as well as bare earth sections). Accordingly, the above-described inpainting technique combining both PDE-based and exemplar-based algorithms advantageously provides a fill method that is able to handle filling of different types of data (of both high and low frequency) autonomously. The combination of these methods may be applied in such a way that the test for when to switch is provided with no extra calculation (using the data priority of the exemplar approach), and so that each algorithm is used in a situation that maximizes its benefits while mitigating its potential drawbacks, as noted above. As such, the approach is well-suited for application to different production situations including, but not limited to, inpainting for bare earth following automatic extraction of culture and vegetation, and filling in missing data regions created during the data collection, for example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
a geospatial data storage device; and
a processor cooperating with said geospatial data storage device and configured to selectively inpaint data into at least one void in geospatial model data using a partial differential equation (PDE) algorithm or an exemplar algorithm;
wherein said processor is further configured to determine a void complexity predictor metric for the at least one void based upon a perimeter of the at least one void, and select between the PDE algorithm and the exemplar algorithm based upon the void complexity predictor metric.

2. The geospatial modeling system of claim 1 wherein said processor is configured to select between the PDE algorithm and the exemplar algorithm based upon whether the void complexity predictor metric is greater than a data frequency threshold.

3. The geospatial modeling system of claim 2 wherein said processor is configured to select the exemplar algorithm if the void complexity predictor is greater than the data frequency threshold, and otherwise selects the PDE algorithm.

4. The geospatial modeling system of claim 2 wherein said processor is configured to initially select and iteratively use the exemplar algorithm until the void complexity predictor is less than the data frequency threshold, and then select and iteratively use the PDE algorithm.

5. The geospatial modeling system of claim 1 wherein said processor is configured to select between the PDE algorithm and the exemplar algorithm further based upon a size of the geospatial model data.

6. The geospatial modeling system of claim 1 wherein said processor is configured to select between the PDE algorithm and the exemplar algorithm further based upon an error level of a candidate exemplar source fill region.

7. The geospatial modeling system of claim 1 wherein the geospatial model data comprises elevation data.

8. The geospatial modeling system of claim 7 wherein said processor is configured to use the PDE algorithm to inpaint by propagating elevation contour data from outside the at least one void along a direction of lines of constant elevation contour from outside the at least one void into the at least one void.

9. The geospatial modeling system of claim 7 wherein said processor is configured to iteratively propagate the elevation contour data from outside the at least one void into the at least one void.

10. The geospatial modeling system of claim 1 wherein said processor is configured to receive as an input geospatial model data containing both geospatial model terrain data and geospatial model cultural feature data and extracts and processes the geospatial model cultural feature data.

11. The geospatial modeling system of claim 1 wherein the PDE algorithm comprises at least one turbulent fluid flow modeling algorithm.

12. A geospatial modeling system comprising:
a geospatial data storage device configured to store geospatial model data; and
a processor cooperating with said geospatial data storage device and configured to
(a) determine a void complexity predictor metric for least one void in the geospatial model data based upon a perimeter of the at least one void,
(b) select between a partial differential equation (PDE) algorithm and an exemplar algorithm based upon the void complexity predictor metric,
(c) inpaint data into the at least one void in the geospatial model data using the selected algorithm, and
(d) repeat (a)-(c) until a stopping value associated with the at least one void is below an error threshold.

13. The geospatial modeling system of claim 12 wherein said processor is configured to select between the PDE algorithm and the exemplar algorithm based upon whether the void complexity predictor metric is greater than a data frequency threshold.

14. The geospatial modeling system of claim 13 wherein said processor is configured to select the exemplar algorithm if the void complexity predictor is greater than the data frequency threshold, and otherwise selects the PDE algorithm.

15. The geospatial modeling system of claim 13 wherein said processor is configured to initially select and iteratively use the exemplar algorithm until the void complexity predictor is less than the data frequency threshold, and then select and iteratively use the PDE algorithm.

16. The geospatial modeling system of claim 12 wherein said processor is configured to select between the PDE algorithm and the exemplar algorithm based upon a size of the geospatial model data.

17. A geospatial modeling method comprising:
providing geospatial model data; and
selectively inpainting data into at least one void in the geospatial model data using a partial differential equation (PDE) algorithm or an exemplar algorithm by
determining a void complexity predictor metric for the at least one void based upon a perimeter of the at least one void, and
selecting between the PDE algorithm and the exemplar algorithm based upon the void complexity predictor metric.

18. The geospatial modeling method of claim 17 wherein selecting comprises selecting between the PDE algorithm and the exemplar algorithm based upon whether the void complexity predictor metric is greater than a data frequency threshold.

19. The geospatial modeling method of claim 18 wherein selecting comprises selecting the exemplar algorithm if the void complexity predictor is greater than the data frequency threshold, and otherwise selecting the PDE algorithm.

20. The geospatial modeling method of claim 19 wherein selectively inpainting comprises iteratively inpainting the at least one void; and wherein selecting comprises iteratively selecting the exemplar algorithm until the void complexity predictor is less than the data frequency threshold, and thereafter iteratively selecting the PDE algorithm.

21. The geospatial modeling method of claim 17 wherein selecting comprises selecting between the PDE algorithm and the exemplar algorithm further based upon a size of the geospatial model data.

22. The geospatial modeling method of claim 17 wherein selectively inpainting comprises iteratively inpainting data into the at least one void until a stopping value associated with the at least one void is below an error threshold.

23. A non-transitory computer-readable medium having computer-executable instructions for causing a computer to perform at least one step comprising:
selectively inpainting data into at least one void in geospatial model data using a partial differential equation (PDE) algorithm or an exemplar algorithm by
determining a void complexity predictor metric for the at least one void based upon a perimeter of the at least one void, and
selecting between the PDE algorithm and the exemplar algorithm based upon the void complexity predictor metric.

24. The non-transitory computer-readable medium of claim 23 wherein selecting comprises selecting between the PDE algorithm and the exemplar algorithm further based upon a size of the geospatial model data.

25. The non-transitory computer-readable medium of claim 23 wherein selectively inpainting comprises iteratively inpainting data into the at least one void until a stopping value associated with the at least one void is below an error threshold.

26. A geospatial modeling system comprising:
a geospatial data storage device; and
a processor cooperating with said geospatial data storage device and configured to selectively inpaint data into at least one void in geospatial model data using a partial differential equation (PDE) algorithm or an exemplar algorithm;
wherein said processor is further configured to select between the PDE algorithm and the exemplar algorithm based upon a size of the geospatial model data.

27. The geospatial modeling system of claim 26 wherein said processor is configured to iteratively inpaint data into the at least one void until a stopping value associated with the at least one void is below an error threshold.

28. A geospatial modeling system comprising:
a geospatial data storage device; and
a processor cooperating with said geospatial data storage device and configured to selectively inpaint data into at least one void in geospatial model data using a partial differential equation (PDE) algorithm or an exemplar algorithm;
wherein said processor is further configured to select between the PDE algorithm and the exemplar algorithm based upon an error level of a candidate exemplar source fill region.

29. The geospatial modeling system of claim 28 wherein said processor is configured to iteratively inpaint data into the at least one void until a stopping value associated with the at least one void is below an error threshold.

* * * * *